United States Patent
Kawasaki

(10) Patent No.: US 7,889,367 B2
(45) Date of Patent: Feb. 15, 2011

(54) PRINTING-APPARATUS CONTROL METHOD AND INFORMATION PROCESSING APPARATUS AND PROGRAM FOR PERFORMING THE SAME METHOD

(75) Inventor: Keiji Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1104 days.

(21) Appl. No.: 11/418,013

(22) Filed: May 4, 2006

(65) Prior Publication Data

US 2006/0274331 A1 Dec. 7, 2006

(30) Foreign Application Priority Data

May 10, 2005 (JP) ............... 2005-137891

(51) Int. Cl.
*G06F 3/12* (2006.01)
*G06K 15/00* (2006.01)

(52) U.S. Cl. ............ 358/1.14; 358/1.13; 358/1.15; 358/1.17

(58) Field of Classification Search ............ 358/1.1, 358/1.5, 1.12, 1.14, 1.18, 296, 500; 399/382
See application file for complete search history.

(56) References Cited

U.S. PATENT DOCUMENTS

| 2,233,472 | A * | 3/1941 | Demarest ............ 101/132 |
| 6,608,990 | B1 * | 8/2003 | Gonnella et al. ...... 399/382 |
| 7,444,109 | B2 * | 10/2008 | Kimura ............... 399/382 |
| 2002/0171710 | A1 * | 11/2002 | Franzke .............. 347/43 |

FOREIGN PATENT DOCUMENTS

| JP | 08-118612 | A |   | 5/1996 |
| JP | 11-348247 | A |   | 12/1999 |
| JP |   11348247 | A | * | 12/1999 |
| JP | 2004-122724 | A |   | 4/2004 |

* cited by examiner

*Primary Examiner*—James A Thompson
(74) *Attorney, Agent, or Firm*—Canon U.S.A., Inc. I.P. Division

(57) ABSTRACT

An information processing apparatus according to the present invention determines whether a slip sheet should be inserted after a page of interest has been printed according to at least one of the paper type for the page and the size of an object on the page. If it is determined that a slip sheet is necessary for the page, a slip-sheet insert command for inserting a slip sheet for the page is automatically issued.

18 Claims, 15 Drawing Sheets

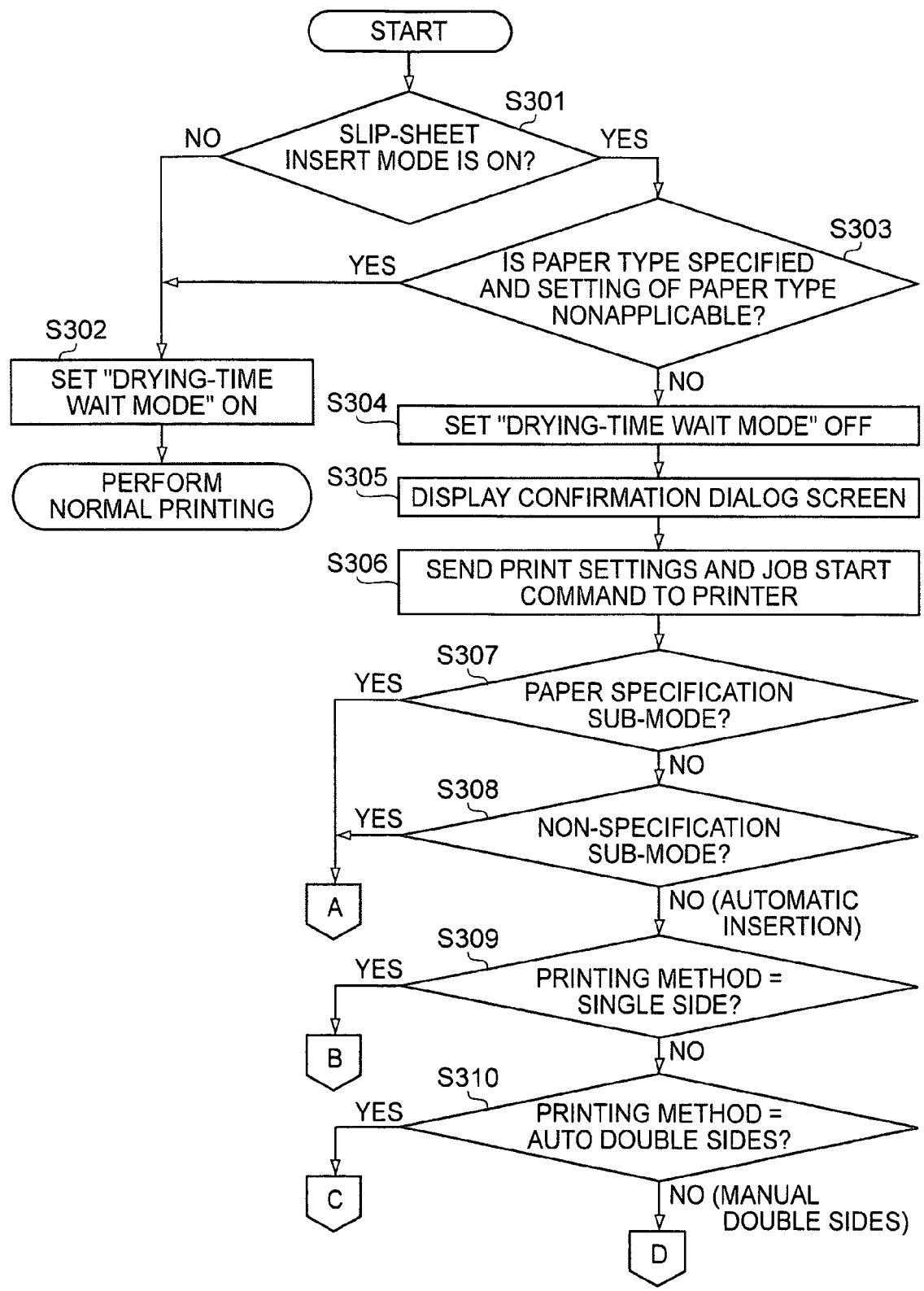

FIG. 7
PRINTING ODD-NUMBER PAGES
POSITIONS OF SLIP SHEETS AFTER PRINTING IS COMPLETED
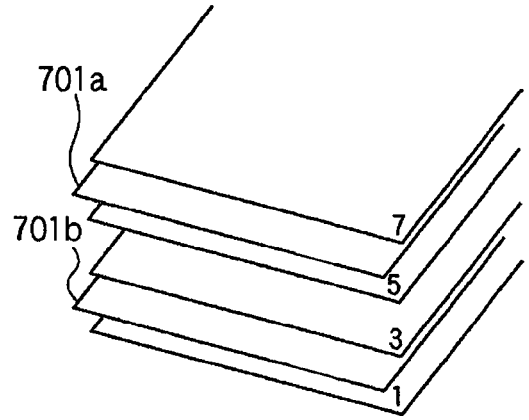
PRINTING EVEN-NUMBER PAGES
POSITIONS OF SLIP SHEETS AFTER PRINTING IS COMPLETED
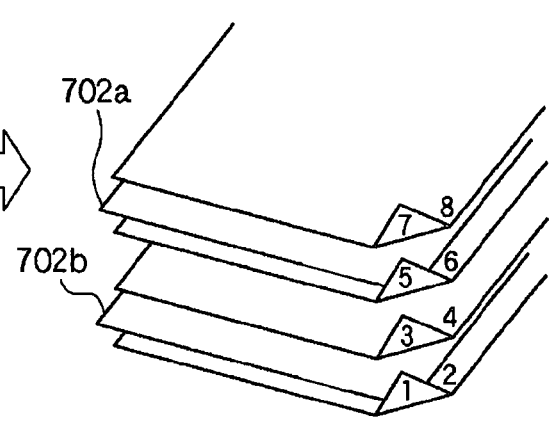

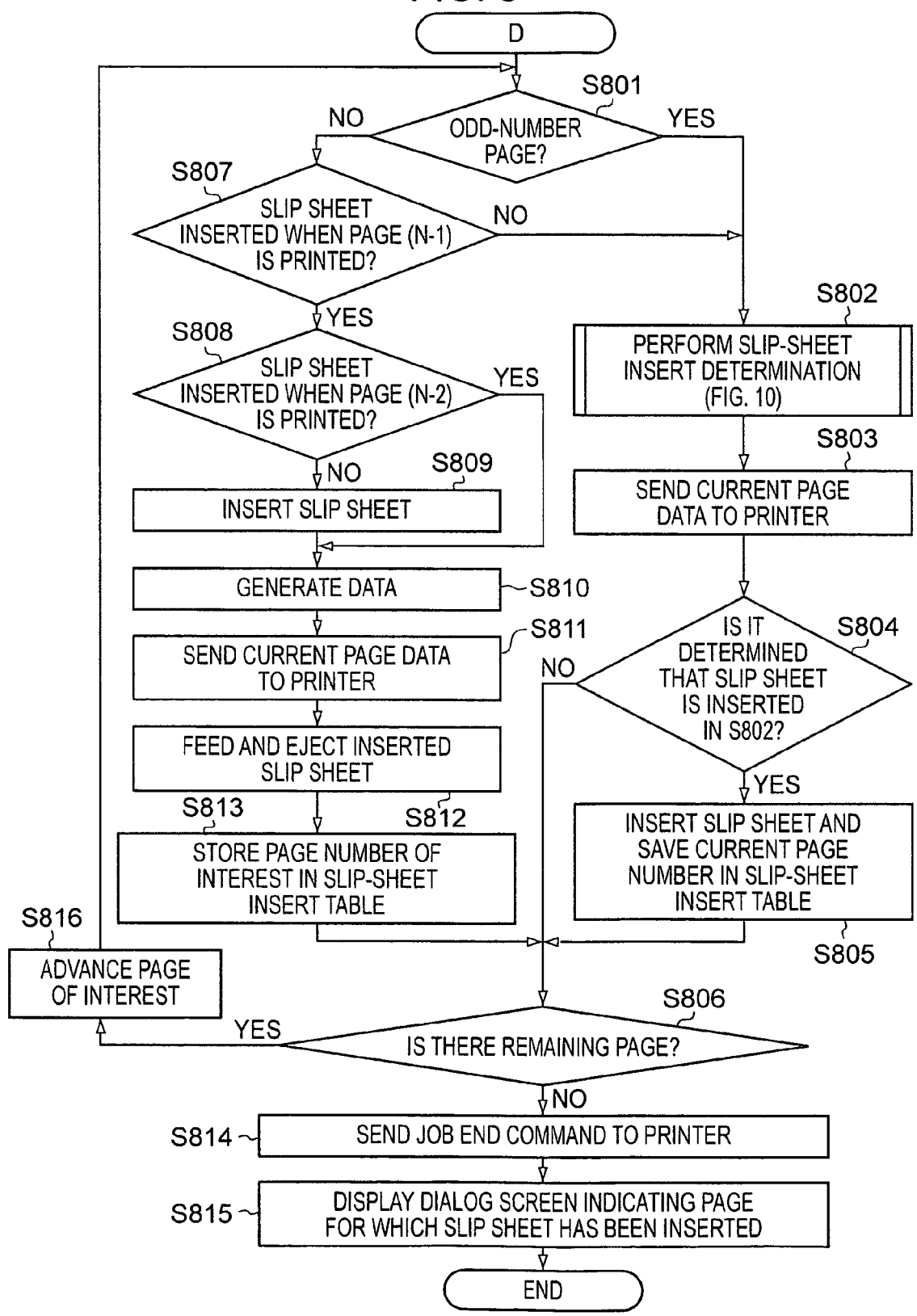

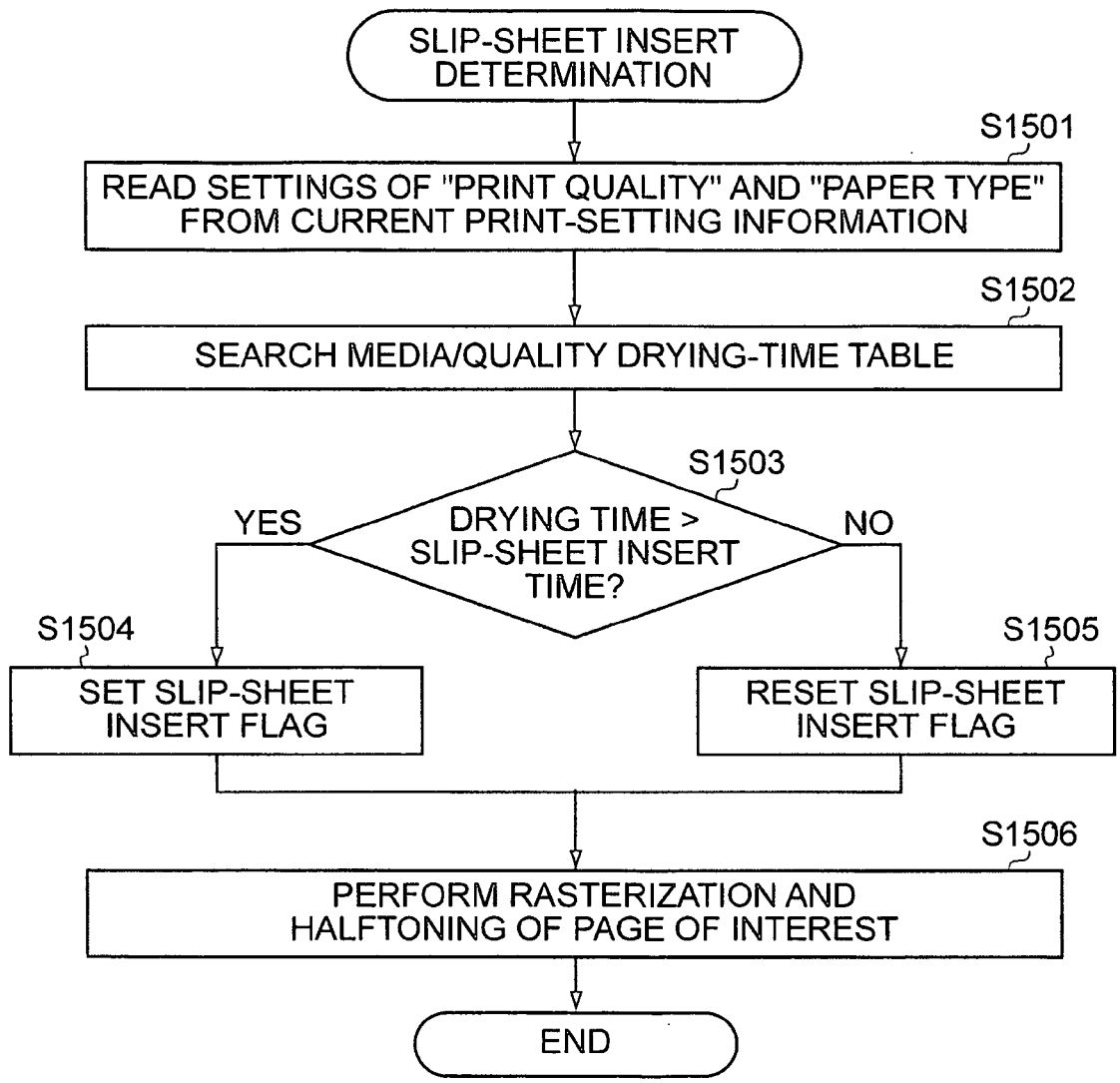

PRINTING-APPARATUS CONTROL METHOD AND INFORMATION PROCESSING APPARATUS AND PROGRAM FOR PERFORMING THE SAME METHOD

BACKGROUND OF THE INVENTION

1. Field of the Invention

The present invention relates to printing-apparatus control methods and information processing apparatuses and programs for performing the same methods. In particular, the present invention relates to a printing-apparatus control method and an information processing apparatus and a program for performing the same method to insert slip sheets when a plurality of pages are printed.

2. Description of the Related Art

Typical ink-jet printers require a certain period of time until ink on printed paper dries. To overcome this shortcoming, a printer having an ink drying wait time mode is disclosed in Japanese Patent Laid-Open No. 11-348247. If the ink drying wait time mode is specified, this printer suspends printing the subsequent page for an ink drying wait time determined according to the type of the previously printed paper.

Furthermore, inserting a slip sheet between printed sheets is also known as a technique for preventing printed sheets from being fouled as a result of one ink-undried sheet being stacked on another.

However, if a printer having an ink drying wait time mode performs printing in the ink drying wait time mode, the print time is prolonged by that ink drying wait time for each print operation, thus decreasing the total throughput. In particular, when printing on high-quality glossy paper is performed, a much longer ink drying wait time is required. In addition, if a slip sheet is inserted for every page to prevent recording agent (ink) on one sheet from transferring onto another, both the slip-sheet insert time and the consumption of sheets increase. To overcome these drawbacks, a user may select pages that would be fouled due to undried ink because, for example, images are printed on those pages and specify to insert slip sheets only for those pages. In this case, however, the user needs to understand and specify page locations at which slip sheets should be inserted to prevent printed sheets from being fouled. This increases workload imposed on the user and decreases the operability of the printer.

SUMMARY OF THE INVENTION

The present invention provides an information processing apparatus capable of inserting slip sheets at appropriate positions to prevent printed sheets from being fouled.

According to a first exemplary embodiment of the present invention, an information processing apparatus having a print command feature for causing a printing apparatus to perform printing is provided. The information processing apparatus includes an acquisition unit configured to acquire print setting information, including at least a paper type; a determination unit configured to determine a page location at which a slip sheet is inserted, based on the paper type, in an automatic insert mode in which the slip sheet is automatically inserted; a print-command generation unit configured to generate a page-by-page print command to the printing apparatus; and a paper-insert-command generation unit configured to generate a slip-sheet insert command for inserting a slip sheet at the determined page location relative to the print command.

According to an aspect of the aforementioned embodiment, the determination unit determines the page location at which the slip sheet is inserted by determining whether or not to insert a slip sheet for each page based on application data passed from an application program, raster data obtained by rasterizing the application data, or halftone data generated by performing the pseudo-halftone process to the raster data, in addition to the print setting information.

According to another aspect of the present embodiment, the information processing apparatus further includes a set-command generation unit configured to generate a set command for turning on or off an ink drying wait time mode for the printing apparatus so that a predetermined interval is provided from one print operation to a subsequent print operation if the ink drying wait time mode is on, wherein the set-command generation unit generates a set command for turning off the ink drying wait time mode for a page corresponding to the page location determined by the determination unit. And, according to another aspect of the present embodiment, the set-command generation unit generates a set command for turning on the ink drying wait time mode for a page for which no slip sheet is inserted.

Furthermore, according to another aspect of the instant embodiment, the paper-insert-command generation unit generates the slip-sheet insert command for inserting a slip sheet including a specification of a paper-feed bin in the printing apparatus. Moreover, according to another aspect of the present embodiment, if a printing method included in the print setting information is an automatic double-sided printing method, the determination unit determines the page location at which the slip sheet is inserted by determining whether to insert a slip sheet for each page depending on whether a page of interest is an odd-number page.

Still further, according to another aspect of the present embodiment, if a printing method included in the print setting information is a manual double-sided printing method for printing one face of every sheet first followed by printing the other face of every sheet, the determination unit stores a page location for which the slip-sheet insert command is issued when data on the one face of every sheet is transmitted to the printing apparatus and determines that a position at which no slip sheet is disposed is a page location at which a slip sheet is inserted when the other face of every sheet is printed. Also, in yet another aspect of the present embodiment, the information processing apparatus may further include a display unit configured to display a page position at which a slip sheet is inserted after printing is completed.

According to another exemplary embodiment of the present invention, an information processing apparatus having a print command feature for causing a printing apparatus to perform printing is provided. The information processing apparatus includes a determination unit configured to compare an ink drying wait time with a certain value based on print setting information to determine which is larger; and a command-generation unit configured to issue a slip-sheet insert command to the printing apparatus in addition to a print command for causing the printing apparatus to print a sheet if it is determined that the ink drying wait time is larger than the certain value.

According to yet another exemplary embodiment of the present invention, an information processing apparatus having a print command feature for causing a printing apparatus to perform printing is provided. The information processing apparatus includes a determination unit configured to compare an image percent defined as a proportion of an image object occupied on one page with a certain value based on print setting information to determine which is larger; and a command-generation unit configured to issue a slip-sheet insert command to the printing apparatus in addition to a print command for causing the printing apparatus to print one sheet if it is determined that the image percent is larger than the certain value.

Moreover, according to still another exemplary embodiment of the present invention, an information processing method carried out by an information processing apparatus configured to generate a print command for causing a printing apparatus to perform printing is provided. The method includes acquiring print setting information, including at least a paper type; determining a page location at which a slip sheet is inserted, based on the paper type, in an automatic insert mode in which a slip sheet is automatically inserted; generating a page-by-page print command to the printing apparatus; and generating a slip-sheet insert command for inserting a slip sheet at the determined page location relative to the generated print command.

According to an aspect of the aforementioned embodiment, the page location at which the slip sheet is inserted is determined by determining whether or not to insert a slip sheet for each page based on application data passed from an application program, raster data obtained by rasterizing the application data, or halftone data generated by performing the pseudo-halftone process to the raster data, in addition to the print setting information. And also, according to another aspect of the present embodiment, the method may further include generating a set command for turning on or off an ink drying wait time mode for the printing apparatus so that a predetermined interval is provided from one print operation to the subsequent print operation if the ink drying wait time mode is on, wherein a set command for turning off the ink drying wait time mode is generated for a page corresponding to the page location.

Furthermore, according to yet another aspect of the present embodiment, a set command for turning on the ink drying wait time mode is generated for a page for which no slip sheet is inserted. Additionally, according to another aspect of the instant embodiment, the slip-sheet insert command for inserting a slip sheet including a specification of a paper-feed bin in the printing apparatus is generated. And yet in another aspect of the present embodiment, if a printing method included in the print setting information is an automatic double-sided printing method, the page location at which the slip sheet is inserted is determined by determining whether to insert a slip sheet for each page depending on whether a page of interest is an odd-number page.

Moreover, according to another aspect of the present embodiment, if a printing method included in the print setting information is a manual double-sided printing method for printing one face of every sheet first followed by printing the other face of every sheet, a page location for which the slip-sheet insert command is issued is stored when data on the one face of every sheet is transmitted to the printing apparatus and it is determined that a position at which no slip sheet is disposed is a page location at which a slip sheet is inserted when the other face of every sheet is printed. And, according to yet another aspect of the present embodiment, the method may also include displaying a page position at which a slip sheet is inserted after printing is completed.

Furthermore, according to another exemplary embodiment of the present invention, an information processing method carried out by an information processing apparatus configured to generate a print command for causing a printing apparatus to perform printing is provided. Here, the method includes comparing an ink drying wait time required to dry a printed sheet with a certain value based on print setting information to determine which is larger; and issuing a slip-sheet insert command to the printing apparatus in addition to a print command for causing the printing apparatus to print one sheet if it is determined that the ink drying wait time is larger than the certain value.

Additionally, according to yet another exemplary embodiment of the present invention, an information processing method carried out by an information processing apparatus configured to generate a print command for causing a printing apparatus to perform printing is provided which includes comparing an image percent defined as a proportion of an image object occupied on one page with a certain value based on print setting information to determine which is larger; and issuing a slip-sheet insert command to the printing apparatus in addition to a print command for causing the printing apparatus to print a sheet if it is determined that the image percent is larger than the certain value.

Furthermore, according to still yet another exemplary embodiment of the present invention, a print control program stored on a computer-readable recording medium and executable by an information processing apparatus configured to generate a print command for causing a printing apparatus to perform printing is provided. The program includes instructions for acquiring print setting information, including at least a paper type; instructions for determining a page location at which a slip sheet is inserted based on the paper type in the print setting information in an automatic insert mode in which a slip sheet is automatically inserted; instructions for generating a page-by-page print command to the printing apparatus; and instructions for generating a slip-sheet insert command for inserting a slip sheet at the page location with respect to the print command.

In an aspect of the present embodiment, the page location at which the slip sheet is inserted is determined by determining whether or not to insert a slip sheet for each page based on application data passed from an application program, raster data obtained by rasterizing the application data, or halftone data generated by performing the pseudo-halftone process to the raster data, in addition to the print setting information. And in another aspect of the present embodiment, the program may further include instructions for generating a set command for turning on or off an ink drying wait time mode for the printing apparatus so that a predetermined interval is provided from one print operation to the subsequent print operation if the ink drying wait time mode is on, wherein a set command for turning off the ink drying wait time mode is generated for a page corresponding to the page location.

Additionally, in yet another aspect of the instant embodiment, a set command for turning on the ink drying wait time mode is generated for a page for which no slip sheet is inserted. Moreover, in another aspect of the present embodiment, the slip-sheet insert command for inserting a slip sheet, including a specification of a paper-feed bin in the printing apparatus, is generated. Still further, according to another aspect of the present embodiment, if a printing method included in the print setting information is an automatic double-sided printing method, the page location at which the slip sheet is inserted is determined by determining whether to insert a slip sheet for each page depending on whether a page of interest is an odd-number page.

Additionally, according to yet another aspect of the instant embodiment, if a printing method included in the print setting information is a manual double-sided printing method for printing one face of every sheet first followed by printing the other face of every sheet, a page location for which the slip-sheet insert command is issued is stored when data on the one face of every sheet is transmitted to the printing apparatus and it is determined that a position at which no slip sheet is disposed is a page location at which a slip sheet is inserted when the other face of every sheet is printed. Further, in another aspect of the present embodiment, the print control program may further include displaying a page position at which a slip sheet is inserted after printing is completed.

And further, according to still another exemplary embodiment of the present invention, a print control program stored on a computer-readable recording medium and executable by an information processing apparatus configured to generate a print command for causing a printing apparatus to perform printing is provided. Here, the program includes instructions for comparing an ink drying wait time required to dry a printed sheet with a certain value based on print setting information to determine which is larger; and instructions for issuing a slip-sheet insert command to the printing apparatus in addition to a print command for causing the printing apparatus to print one sheet if it is determined that the ink drying wait time is larger than the certain value.

And finally, according to another exemplary embodiment of the present invention, a print control program stored on a computer-readable recording medium and executable by an information processing apparatus configured to generate a print command for causing a printing apparatus to perform printing is provided which includes instructions for comparing an image percent defined as a proportion of an image object occupied on one page with a certain value based on print setting information to determine which is larger; and instructions for issuing a slip-sheet insert command to the printing apparatus in addition to a print command for causing the printing apparatus to print one sheet if it is determined that the image percent is larger than the certain value.

In order to prevent undried ink from transferring from one printed recording medium to another, a user can select to insert a slip sheet instead of waiting for the ink to dry. This reduces a total print time. Depending on the type of print sheets, placing a slip sheet onto a print sheet that has just been printed may cause the color on the print sheet to change. Nevertheless, ink transfer from one printed sheet to another can be prevented more reliably by using a slip sheet than waiting for ink to dry. In a case where more than about 100 sheets are printed, ink transfer is more likely to occur due to the weight of the bundle of sheets. This problem is noticeable particularly when new year greeting cards are printed, which is one of major applications of personal printers.

An ultimate solution to the problem of a change in color caused by stacking one sheet on another is not to stack printed sheets, such as to lay out one printed sheet at a time and leave each printed sheet until ink dries. This kind of work should be done by a user and is difficult to achieve by a printer mechanism or control program. The present invention provides a function for allowing a plurality of pages to be printed reliably and efficiently without causing ink transfer or imposing additional workload onto a user.

Furthermore, for double-sided printing, front faces of sheets are lightly printed in many cases in order to prevent rear faces of sheets from being contaminated with undried ink attached on the feed roller of the printer main body during printing of the front faces. The present invention is also advantageous in that a slip sheet (white paper) inserted after every page serves as the cleaner of the feed roller, which allows sheets to be printed with normal density also in double-sided printing. According to the present invention, in the automatic insert mode in which a slip sheet is automatically inserted, a slip sheet can be inserted at a desired position by determining a page location at which a slip sheet is inserted based on print setting information including the print quality and the paper type and issuing to the printing apparatus a command for inserting a slip sheet at the determined position. This prevents recording agent printed on one sheet from transferring to another while avoiding a great decrease in print throughput.

Further features and aspects of the present invention will become even more apparent from the following description of exemplary embodiments (with reference to the attached drawings).

BRIEF DESCRIPTION OF THE DRAWINGS

FIG. 3 is a diagram depicting a flowchart for exemplary job initialization by a printer graphic driver when a slip-sheet insert mode is set.

FIG. 7 is a diagram depicting different slip-sheet positions between odd-number page printing and even-number page printing when manual double-sided printing is carried out.

FIG. 8 is a diagram depicting a flowchart for exemplary processing subsequent to job initialization by the printer graphic driver when manual double-sided printing is carried out with a setting for automatically inserting slip sheets by analyzing the content to be printed.

FIG. 15 is a diagram depicting a flowchart for an exemplary process of determining whether to insert a slip sheet with reference to print qualities and paper types, according to a fourth embodiment.

FIG. 16 is a diagram depicting an example of relationships among print qualities, paper types, and ink drying wait time according to the fourth embodiment.

DESCRIPTION OF THE EMBODIMENTS

Numerous exemplary embodiments according to the present invention will now be described in detail with reference to the attached drawings.

First Exemplary Embodiment

Figure 1:
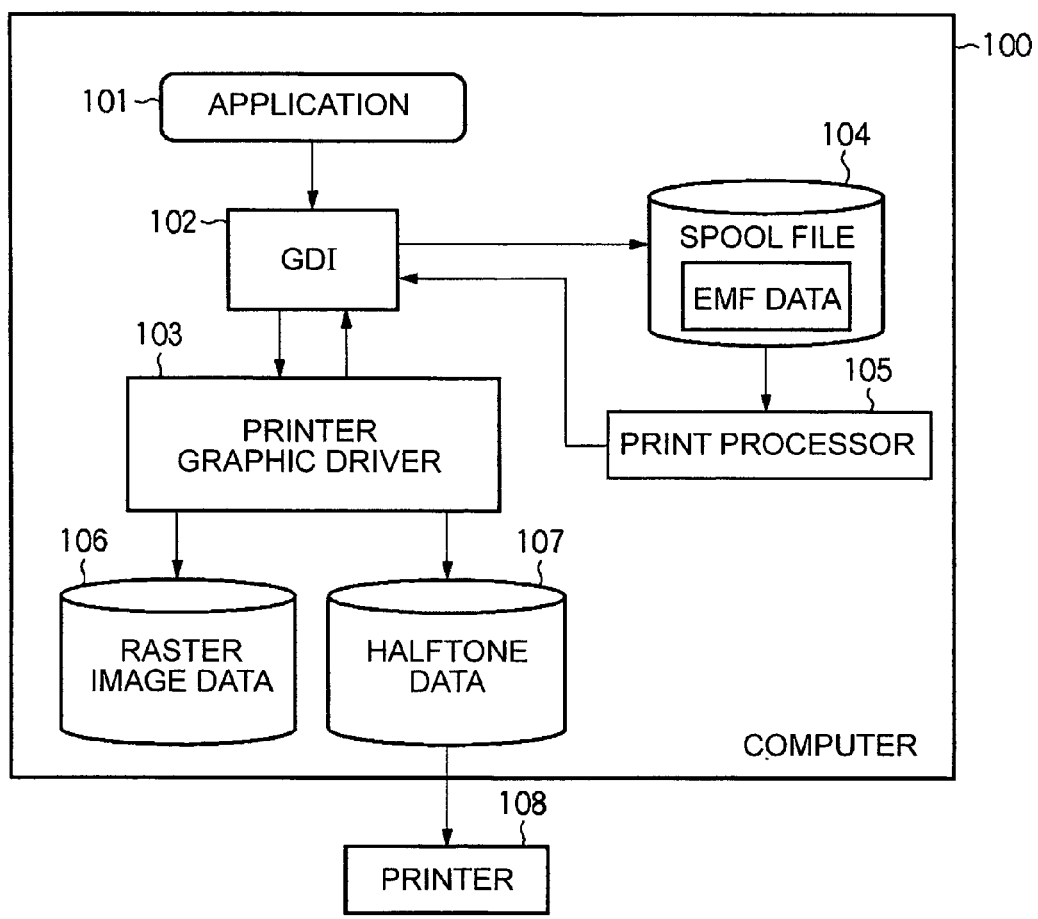
FIG. 1 is a block diagram depicting an exemplary configuration of a print system according to a first embodiment of the present invention.

FIG. 1 is a block diagram depicting an exemplary configuration of a print system according to a first embodiment of the present invention. A computer 100 used in the embodiment shown in FIG. 1 is, for example, a general personal computer (equivalent to an information processing apparatus) employing Microsoft Windows®, for example, as an operating system (hereinafter, referred to as the OS) and having an installed application 101 with a print processing function. Furthermore, a printer 108 (e.g., ink-jet printer) employing a printing method which requires a certain period of time until recording agent, such as ink, dries is connected to this computer 100.

Drawing data (print data such as document data and image data) whose printing is requested by the application 101 is passed to a printer graphic driver 103 via a GDI 102 serving as a drawing module of the OS. As a result, the printer graphic driver 103 generates a print job, which is then output as a print request to the printer 108. In general, the GDI 102 performs spooling (spooling by the OS) of the drawing data into a spool file 104 as Enhanced Meta File (EMF) data.

When the spooling ends, a print request is issued to a print processor 105. As a result, the print processor 105 reads print output information and the drawing data from the spool file 104 on a page-by-page basis and outputs one page of the drawing data at a time to the printer graphic driver 103 via the GDI 102 to request the printer graphic driver 103 to perform printing. Although this print processor 105 is prepared as an OS module, a print processor 105 customized by the printer manufacturer or other organizations can be supplied together with the printer graphic driver 103 so that they can be installed in a hard disk.

The printer graphic driver 103, which has been requested to perform printing by the print processor 105 in this manner, performs rendering according to the print resolution of the printer 108 by the use of a GDI rendering engine, serving as a drawing function of the GDI 102, and generates raster image data 106 from the read-out drawing data. This raster image data 106 is multiple-valued data which retains a color normally as a multiple-level value. The printer graphic driver 103 performs color processing based on this multiple-valued data to generate halftone data 107 separated into color components corresponding to ink supported by the printer 108.

Thereafter, the printer graphic driver 103 performs processing such as adding printer commands to generate a print job, which is then transmitted to the printer 108. If the printer 108 is a multiple-valued printer which supports multiple-valued data, the print job can be transmitted to the printer 108 in the form of the raster image data 106. In this case, however, the printer graphic driver 103 needs to carry out quantization processing according to multiple levels manipulated in the printer 108.

The printer 108 includes two or more paper-feed ports so that it can feed paper for printing and paper for slip-sheet insertion from different paper-feed ports. An example of the printer 108 includes an ink-jet printer which discharges ink droplets from nozzles according to image data and records the image data onto a printing medium (print sheet). The ink-jet method includes a serial technique and a line technique. Printers employing the serial technique have a head for each color component in which a plurality of nozzles are arranged in series in the sheet feeding direction. Ink is discharged according to the image while this recording head is scanned in a direction perpendicular to the sheet feeding direction to record one band. When one band of image is formed, the sheet is advanced by the band width (or band-width bands may be overlapped) at a time to repeat band formation. One page of image is formed in this manner.

On the other hand, printers employing the line technique include a line recording head for each color component in which a number of nozzles equivalent to the recording width are arranged in series in a direction perpendicular to the sheet feeding direction. An image is formed by the recording head one line at a time and advancing the sheet by one line is repeated to form one page of image.

Furthermore, the printer 108 has an ink drying wait time mode. For example, an ink drying wait time flag for indicating an ink drying wait time mode is provided in a memory built into the printer 108. This ink drying wait time flag is set (the ink drying wait time mode is turned on) or is reset (the ink drying wait time mode is turned off) according to a command from the printer graphic driver 103. If the ink drying wait time flag is set, the printer 108 waits a predetermined period of time after image formation of one page is completed until image formation of the subsequent page starts. In other words, when the predetermined wait period of time elapses, image formation of the subsequent page starts. In this manner, a grace period of time long enough for ink to dry is secured to allow the ink on a page placed in a paper-output tray to dry and the formed image to be fixed before the sheet of the subsequent page is ejected onto the page in the output tray. Therefore, the technique of face-up eject is basically used in such an ink drying wait time mode.

In addition, the printer 108 may be a printer having an automatic double-sided printing function (i.e., sheet-turning mechanism). With an automatic double-sided printing function, information can be printed on both faces of sheets without operator's intervention. In the ink drying wait time mode for automatic double-sided printing, ink printed on the front face of a sheet is allowed to dry by waiting a certain period of time while this sheet is placed in a both-side tray of the sheet-turning mechanism before the printing on the rear face of the sheet starts. By doing so, the ink on the rear face of the previous sheet in the normal paper-output tray is also given enough time to dry. For this reason, after printing on the rear face of the sheet is completed, it is not necessary to wait an ink drying wait time before the printing of the subsequent sheet starts. Alternatively, for double-sided printing by the printer 108, it is also acceptable to wait an ink drying wait time as in single-sided printing, that is, to wait before the printing of the subsequent sheet starts after printing on the rear face of the current sheet is completed, instead of waiting an ink drying wait time after printing on the front face of the current sheet is completed.

Furthermore, the printer 108 has a slip-sheet insert function (function for allowing a paper-feed unit to be changed without terminating a print job). Since normal print paper can be used as a slip sheet, a particularly different paper-feed unit is not necessary to perform slip-sheet insert operation. Thus, the slip-sheet insert function can be realized by any printer having at least one paper-feed unit (sheet tray). If print sheets and slip sheets are to be supplied from different sheet trays, however, a printer having a slip-sheet insert function can be used. This is because a normal printer has to terminate a print job in order to change the sheet tray during print processing.

In contrast, with a slip-sheet insert function, a sheet tray for slip-sheet insertion and a sheet tray for printing can be specified separately. Therefore, sheets supplied from a plurality of sheet trays can be used for one print job. If the printer 108 has a slip-sheet insert function, the printer graphic driver 103 issues a slip-sheet insert command to the printer 108 so that a slip sheet is inserted at an appropriate position between items of print data (bit map data) on pages in the print job. The printer 108 interprets and executes the slip-sheet insert command and feeds a sheet from the specified tray to eject it as a slip sheet.

On the other hand, if the printer 108 does not have a slip-sheet insert function, slip-sheet insertion can be achieved by, for example, a sheet supply command and a forced eject command. More specifically, the printer graphic driver 103 issues the sheet supply command and the forced eject command to the printer 108 so that a slip sheet is inserted at an appropriate position between items of print data (bit map data) on pages in the print job. The printer 108 interprets and executes these commands and feeds a sheet from a specified tray to eject it. This ejected sheet serves as a slip sheet. In this embodiment, the slip-sheet insert command (including terms indicating the same meaning) includes the sheet supply command and the forced eject command for slip-sheet insert operations in a case where the printer 108 does not have a slip-sheet insert function.

[Exemplary Hardware Configuration]

Figure 14:
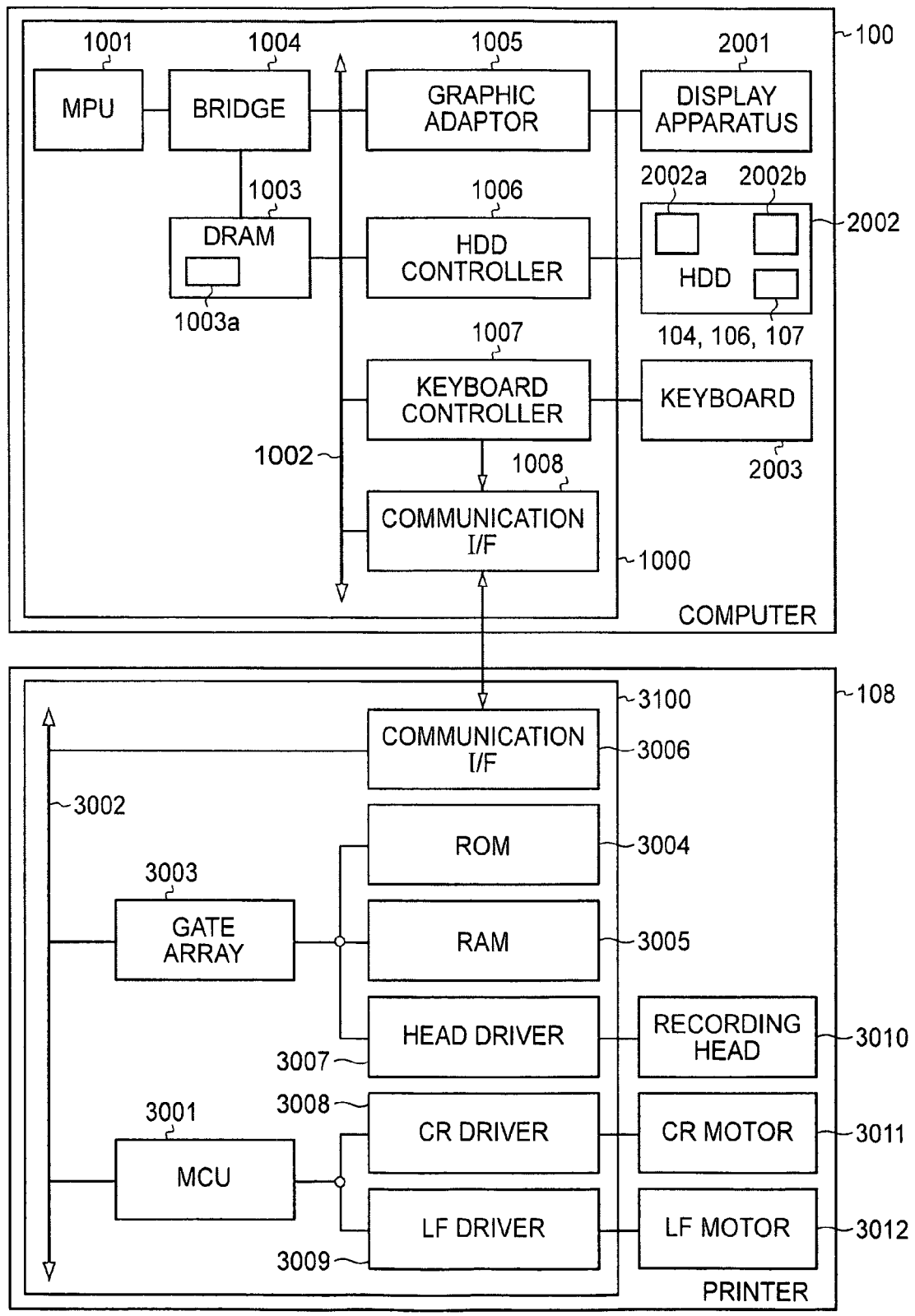
FIG. 14 is a block diagram of an exemplary print system.

FIG. 14 is a hardware block diagram of the exemplary print system shown in FIG. 1. The computer 100 includes a processing section 1000 and peripheral devices. Furthermore, the printer 108 includes a control circuit section 3100 and a drive section including a recording head 3010, a carrier (CR) motor 3011 for driving a carrier that moves the recording head 3010, a feed motor 3012 for feeding sheets, and so forth.

The processing section 1000 of the computer 100 includes an MPU 1001 for comprehensively controlling the host apparatus according to a control program; a bus 1002 for interconnecting system components; a DRAM 1003 for temporarily storing programs executed by the MPU 1001 and data; a system bus and a memory bus; a bridge 1004 for connecting the MPU 1001; and a graphic adaptor 1005 provided with a control function for displaying graphic information on a display apparatus 2001 such as a CRT. A memory area 1003a used by the printer graphic driver 103 is allocated in the DRAM 1003.

The processing section 1000 further includes an HDD controller 1006 for controlling the interface with an HDD unit 2002; a keyboard controller 1007 for controlling the interface with a keyboard 2003; and a communication interface (I/F) 1008, which is a parallel interface, for controlling the communication with the printer 108 according to the IEEE1284 standards or the like.

Furthermore, the display apparatus 2001 (CRT in this example) for displaying, for example, graphic information to the operator via the graphic adaptor 1005 is connected to the processing section 1000. The display apparatus 2001 displays, for example, a user interface screen provided by the printer graphic driver 103. For example, a user interface for print setting and the positions at which slip sheets have been inserted in an automatic slip-sheet insert mode are displayed.

The hard disk drive (HDD) unit 2002 serving as a large-capacity storage device storing programs and data and the keyboard 2003 are individually connected to the processing section 1000 via their respective controllers. The HDD 2002 stores a program file 2002a such as the printer graphic driver 103, a file 2002b for slip-sheet insert determination tables such as the tables shown in FIG. 13 and FIG. 16, a print setting information file such as the one shown in FIG. 2C, and so forth. The HDD 2002 also stores a spool file (EMF data) 104, a raster image data file 106, a halftone data file 107, and so forth.

On the other hand, the control circuit section 3100 of the printer 108 includes an MCU 3001 for comprehensively controlling an image output apparatus main body 52, serving as both a control program execution function and a peripheral device control function; a system bus 3002 for connecting each component in the control circuit section 3100; and a gate array (GA) including mechanisms for supplying record data to the recording head 3010, decoding memory addresses, generating control pulses for the carrier motor 3011, and so on as control circuits.

The control circuit section 3100 further includes a ROM 3004 storing control programs executed by the MCU 3001, host print information, and so forth; a DRAM 3005 storing various types of data (e.g., image record information and record data supplied to the head 3010); a communication I/F 3006, which is a parallel interface, for controlling the communication with the computer 100 according to the IEEE1284 standards; and a head driver 3007 for generating an electrical signal for driving the recording head 3010 based on the head record signal output from the gate array 3003.

The control circuit section 3100 further includes a CR motor driver 3008 for converting a carrier motor control pulse output from the MCU 3001 to an electrical signal for driving the carrier (CR) motor 3011; and an LF motor driver 3009 for converting a feed motor control pulse output from the MCU 3001 to an electrical signal for driving the feed motor 3012.

With the above-described configuration, the system shown in FIG. 1 is realized by executing the operating system, application programs, and the printer graphic driver program.

[Exemplary Print Setting Processing]

Figure 2A:
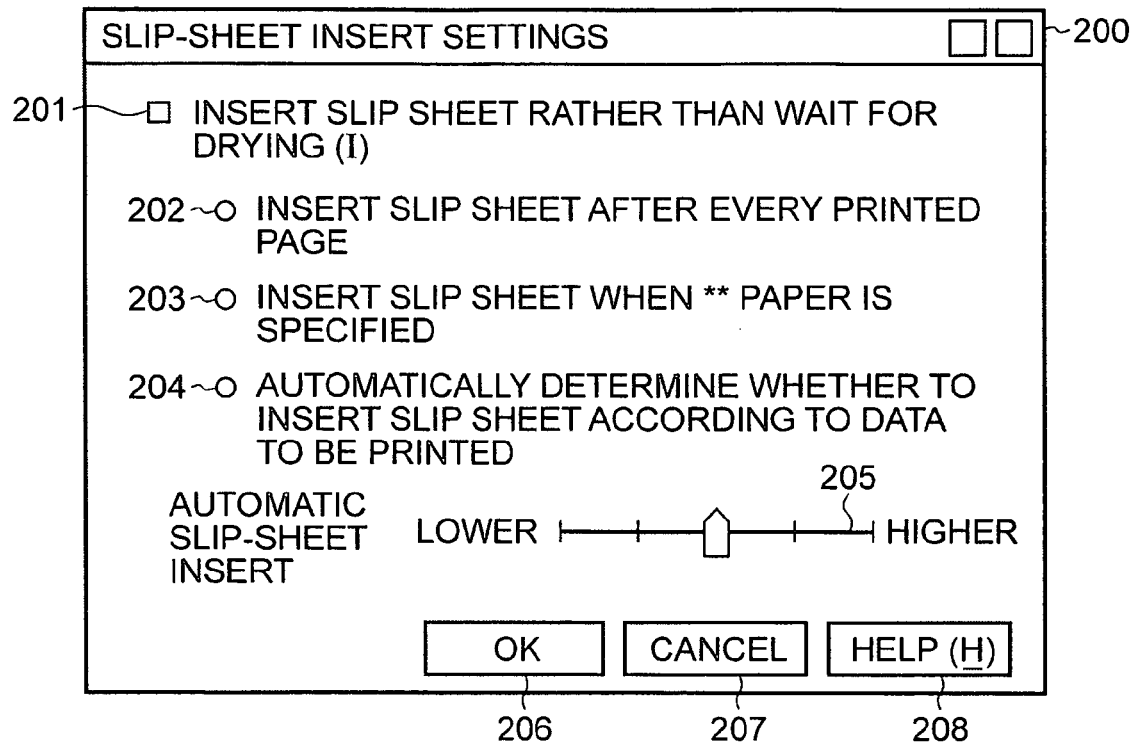
FIG. 2A is a diagram depicting an example of a user interface screen displayed by a printer driver for slip-sheet insert setting.

FIG. 2A is a diagram depicting an exemplary screen 200 for slip-sheet insert setting. This screen is displayed by the printer graphic driver 103, which is called, for example, when an operator instructs the application 101 to print application data. On this user interface screen, various items included in the print setting information can be specified by the operator. The print setting information includes items such as a printing method (double-sided printing/single-sided printing), a slip-sheet insert specification, and an ink drying wait time mode. FIG. 2A shows a screen displaying items for slip-sheet insert setting.

In this embodiment, the print setting information is provided to allow the printer graphic driver 103 (hereinafter, referred to just as the printer driver) to switch between a mode to wait an ink drying wait time after printing (an ink drying wait time mode) and a mode to insert slip sheets without waiting an ink drying wait time (slip-sheet insert mode). When a user instructs the application 101 to print data, the printer driver starts up and the CRT of the host computer displays a screen (not shown in the figure) indicating the current settings of the printer driver.

The printer driver according to the present invention includes display information for displaying a print setting screen (described later) on the display screen. More specifically, the display information represents instructions to the OS to display a dialog screen, including instruction information such as the size of the dialog screen, the locations of radio buttons on the print screen, and the location and options of a pull-down menu, and a plurality of preview images of a predetermined pattern for visually presenting the current print settings to the user.

In order to perform print setting on the print setting screen (not shown in the figure) displayed by an instruction from the printer driver as described above, the user clicks a corresponding button. The print settings include a page setting, a paper-feed setting, a print quality setting, and so forth. When the user performs selection with a pointing device such as a mouse on this displayed screen, a slip-sheet setting screen 200 is displayed.

Still referring to FIG. 2A, on the slip-sheet setting screen 200, the user can specify the slip-sheet insert mode and a slip-sheet insert method. When a checkbox 201 is checked, an alternative slip-sheet insert mode in which slip sheets are inserted without waiting an ink drying wait time can be set. Radio buttons 202, 203, and 204 allow a slip-sheet insert method (sub-mode) in the alternative slip-sheet insert mode to be selected. When the radio button 202 is selected from among the radio buttons 202, 203, and 204, a slip sheet is inserted after each page has been printed (non-specification sub-mode). When the radio button 203 is selected, slip sheets are inserted if a particular type of paper is specified as a print sheet (paper specification sub-mode). When the radio button 204 is selected, data to be printed is automatically analyzed so that a slip sheet is inserted at a position determined as appropriate for inserting a slip sheet (automatic insert sub-mode). The user can select a criterion for determining whether to insert a slip sheet in the automatic insert sub-mode from among five levels by operating a slide bar 205. Level 1 corresponds to fewer slip sheets to be inserted (the criterion for inserting a slip sheet is severer) and level 5 corresponds to more slip sheets to be inserted (the criterion for inserting a slip sheet is more tolerant).

Reference numeral 206 denotes an OK button for accepting the settings and quitting processing, reference numeral 207 denotes a cancel button for canceling the settings and quitting processing, and reference numeral 208 denotes a help button for displaying information about a detailed setting procedure.

Figure 2B:
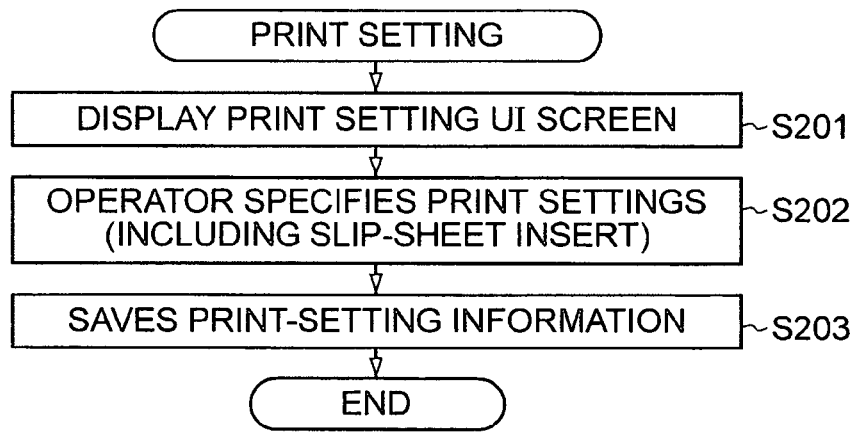
FIG. 2B shows an exemplary processing procedure carried out by a printer driver when print setting information is to be input by an operator.

FIG. 2B shows a processing procedure carried out by the printer driver when the print setting information is input by the operator. First, a print-setting user-interface screen is displayed (S201). On this screen, the operator is allowed to perform setting (S202) and the print setting information when the OK button is pressed is saved (S203). At the same time, the user interface screen closes.

Figure 2C:
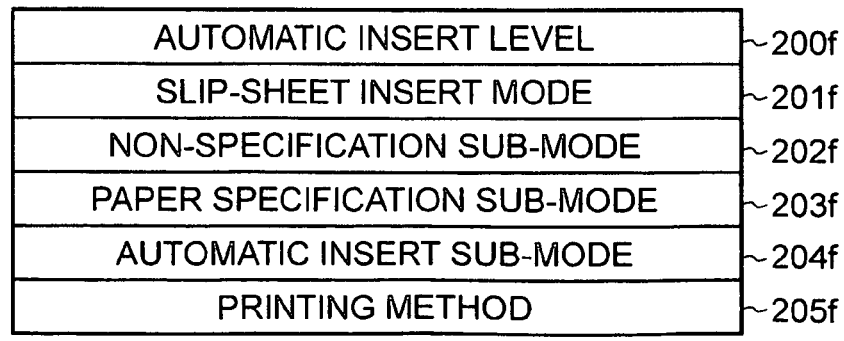
FIG. 2C is a diagram depicting some exemplary print setting information input and saved through the procedure shown in FIG. 2B.

FIG. 2C is a diagram depicting some of the print setting information input and saved through the procedure shown in FIG. 2B. The print setting information is saved in, for example, the hard disk 2002 of the computer 100. A slip-sheet insert mode flag 201f is set according to the checkbox 201, for example, when the checkbox 201 is checked. A non-specification sub-mode flag 202f is set when the radio button 202 is selected. A paper specification sub-mode flag 203f is set when the radio button 203 is selected. An automatic insert sub-mode flag 204f is set when the radio button 204 is selected. A value from 1 to 5 is set to an automatic insert level 200f, according to the level selected with the slide bar 205. A printing method 205f saves information indicating the printing method specified on a user interface screen (not shown in the figure).

The printing method is one of a single-sided printing method, an automatic double-sided printing method, a manual double-sided printing method, and so forth. For the single-sided printing method, printing is performed only on one face of each sheet. For the automatic double-sided printing method, printing is performed on both faces of a sheet by the use of the sheet turning function provided in the printer 108. For the manual double-sided printing method, double-sided printing is achieved even if the printer does not have a sheet turning function. If manual double-sided printing is specified as the printing method, the printer driver sends, for example, only odd-number pages to the printer in ascending order, starting with the top page, and requests operator's intervention (e.g., key operation) when all data has been sent to the printer. When operator's intervention occurs, even-number pages are subsequently sent to the printer in ascending order starting with the top page. It is assumed that the printer ejects sheets face-up in this mode.

When intervention is requested, the operator turns a bundle of all sheets having data printed on single faces at a time and places the bundle of sheets in the paper-feed tray in a predetermined direction. Subsequently, the operator performs an intervention operation to achieve double-sided printing. The operator's turning and placing of the sheets in the paper-feed tray needs to be performed in a consistent way according to, for example, the sheet ejection direction, and hence, the operator's operation described above is just an example.

[Exemplary Slip-sheet Insert Procedure]

Next, processing by the printer graphic driver 103 according to this embodiment after printing has started, namely, processing after the spool file 104 has been received via the GDI 102 from the print processor 105 will be described. FIG. 3 is a flowchart for exemplary initialization processing carried out by the printer graphic driver 103 from when printing is specified to when print data is transmitted to the printer 108.

Referring to FIG. 3, first, the slip-sheet insert mode flag 201f of the print setting information is referred to determine whether the mode in which a slip sheet is inserted instead of waiting an ink drying wait time is specified (S301). If the slip-sheet insert mode flag 201f is off, no slip sheet is inserted and an ink drying-wait time mode flag is set on (S302). In this mode, normal printing is performed in which waiting an ink drying wait time occurs as required. Although the flag may be included in the print setting information so that it can be set on the user interface for print setting, the ink drying wait time mode flag is handled as a temporary flag prepared in a DRAMS in this embodiment. Subsequently, normal print processing is carried out. More specifically, print data for each page is subjected to rendering and quantization processing, a print job is generated based on the data, and the print job is transmitted to the printer 108. At this time, a command for operating the printer 108 in the ink drying wait time mode (drying-time wait command) is placed, for example, at the beginning of the print job.

On the other hand, if the slip-sheet insert mode is on in step S301, the ink drying wait time mode is set off unless applicable to the determination in step S303 (S304). In step S303, it is determined whether the radio button 203 is selected, in other words, the paper specification sub-mode 203f is on, and a particular type of paper is set as a print sheet. This particular type of paper may be separately specified or may be predetermined. Paper requiring a long time before ink dries, such as professional photographic paper, is pre-specified as the particular type of paper. In this case, it is determined in step S303 whether the paper specification sub-mode 203f is on and "professional photographic paper" is set as the print paper. If in step S303 "standard paper" is set by the user as the paper type, for example, on the print setting screen of the printer driver, the condition for professional photographic paper is not satisfied, and therefore, the determination result is YES, which does not satisfy the condition for slip-sheet insert operation. As a result, the flow proceeds to step S302. Here, the paper type can be specified as one item of the print setting information. In this manner, conditional step S303 is provided to set the ink drying wait time mode on if a particular type of paper for which a slip sheet is inserted is not selected even though the slip-sheet insert mode is on.

In general, if the checkbox 201 is checked, that is, the slip-sheet insert mode is on, then antifouling of printed sheets is achieved by inserting slip sheets instead of waiting an ink drying wait time, and therefore, waiting an ink drying wait time should not be required. Nevertheless, in the case of special paper such as double-sided glossy paper, a predetermined ink drying wait time may not be long enough for the ink to dry. Therefore, regardless of whether the checkbox 201 is checked, slip sheets are normally inserted in such a case to ensure antifouling of the special paper. For normal paper other than such a particular type of paper, a predetermined ink drying wait time is long enough for the ink to dry. Thus, if paper other than a predetermined type of paper is set, printing is performed in the ink drying wait time mode.

If the determination result is No in step S303, in other words, if printing is performed in the slip-sheet insert mode, the ink drying wait time mode flag is set off (S304), and then a dialog screen prompting that sheets used as slip sheets be placed in the appropriate paper-feed port from which the slip sheets are fed is displayed (S305). The operator places sheets and presses, for example, the "OK" button on the dialog screen. If it is determined that the slip-sheet insert mode is on and that the paper condition is satisfied through the above-described processing, a print setting specifying the ink drying wait time mode as off, a job start command, and other data are transmitted to the printer (S306). During the initial procedure, a page counter indicating the number of the page of interest needs to be initialized. The page counter is incremented each time the page of interest is advanced by one page to always indicate the current page of interest. This page counter is used to determine whether the current page is an odd-number page or an even-number page and to store the numbers of the pages for which slip sheets have been inserted. Alternatively, the user may be allowed to specify a paper-feed port for feeding slip sheets by a user interface of the printer driver. In this case, display of the confirmation dialog screen in step S305 is not necessary.

Figure 4:
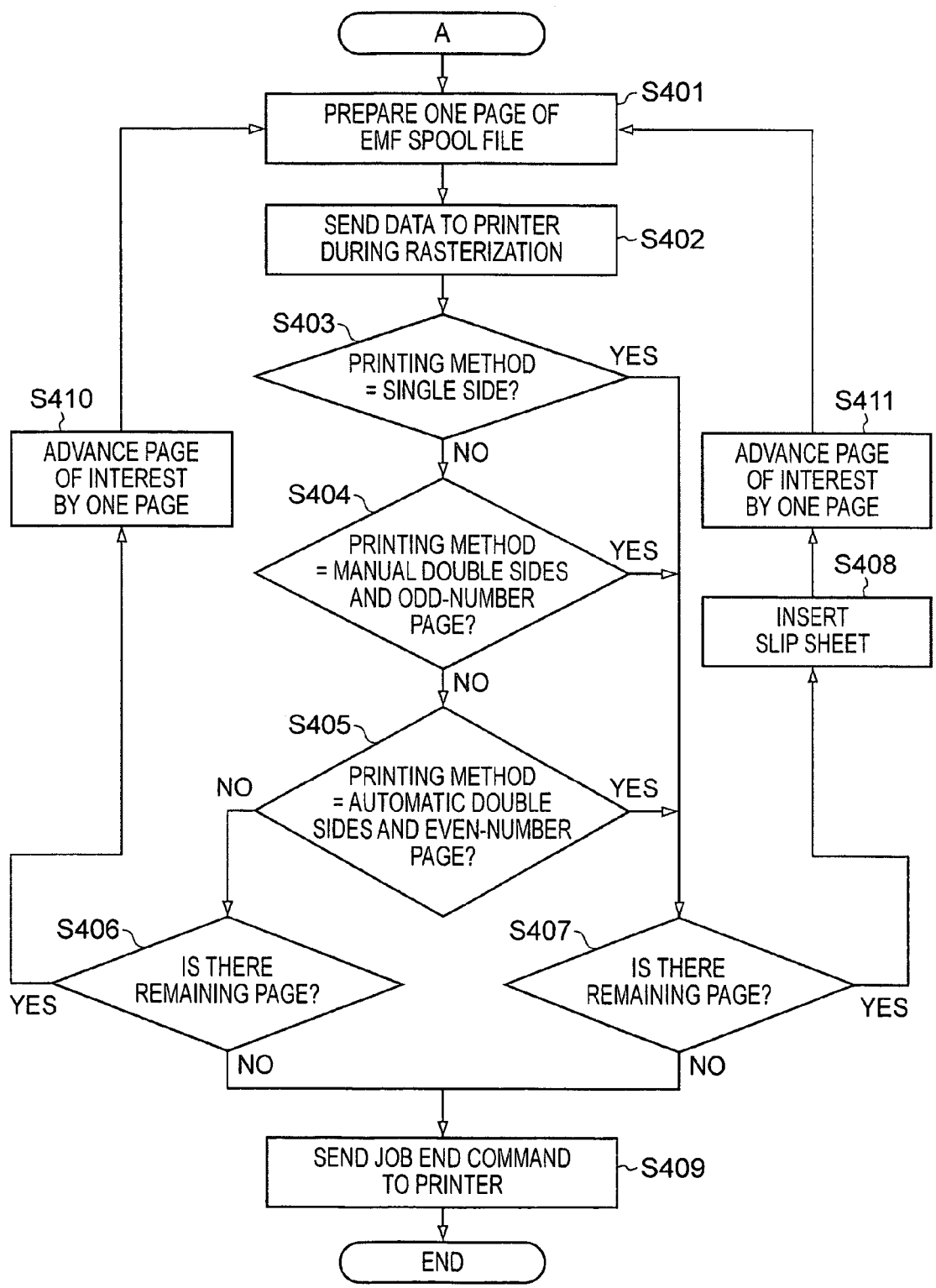
FIG. 4 is a diagram depicting a flowchart for exemplary processing subsequent to job initialization by the printer graphic driver in the case of a setting for inserting slip sheets for all pages.

Thereafter, if the paper specification sub-mode flag is on (i.e., paper specification sub-mode is selected) or if the non-specification sub-mode flag is on (i.e., the non-specification sub-mode is selected), the flow proceeds to the flowchart in FIG. 4 (S307 and S308, respectively). If the paper specification sub-mode and the non-specification sub-mode are not specified, it is next determined whether a single side printing method has been specified at step S309. And if the specified printing method is single-sided, the flow proceeds to the flowchart in FIG. 5. And still further, if the specified printing method is not single-sided, it is next determined whether an auto double sided printing method has been specified at step S310. And if the printing method is auto double sided, the flow proceeds to the flowchart in FIG. 6. And finally, if the printing method specified is manual double sided, the flow proceeds to the flowchart in FIG. 8 (S310). It is also noted that cases that do not satisfy the paper condition in the paper specification sub-mode are already excluded in step S303.

[Exemplary Processing in Non-Specification Sub-Mode or Sheet Specification Sub-Mode]

The processing when the radio button 202 or 203 is selected, in short, the processing in the non-specification sub-mode or the paper specification sub-mode, after initialization processing by the above-described printer graphic driver 103 will be described with reference to FIG. 4. The operation in the paper specification sub-mode is the same as in the non-specification sub-mode where the paper condition is satisfied.

FIG. 4 shows exemplary processing carried out when the radio button 202 is selected, or when the radio button 203 is selected and the print paper is specified as paper for which slip sheets are inserted. In short, the processing in FIG. 4 is carried out when a slip sheet is inserted after every page. First, one page of spool file 104 is received from the print processor 105 (S401). Hereinafter, the page to be subjected to processing is referred to as the page of interest. While the raster image data 106 and the halftone data 107 for the page of interest are being generated based on the received spool file 104, the generated data is transmitted to the printer (S402).

When the one page of data has been transmitted, it is determined whether or not a slip sheet should be inserted for the printed page. First, if the printing method for the print job currently being printed is the single-sided printing setting method (S403-YES), the flow proceeds to step S407, where it is determined whether there is a remaining page, namely, whether the last page for which no slip sheet needs to be inserted has been reached. If there is a remaining page, in short, if it is necessary to insert a slip sheet, the slip-sheet insert command for inserting a slip sheet is issued (S408). The slip-sheet insert command is realized with, for example, a print command for printing a blank page having no data thereon. Alternatively, the slip-sheet insert command may be achieved with a dedicated command for inserting a slip sheet. Either command is regarded as the slip-sheet insert command. Subsequently, the page of interest is advanced (S411) and the flow proceeds to step S401.

If it is determined in step S403 that the printing method is not the single-sided printing method (double-sided printing method in this embodiment), two pages of data are printed on one sheet. In this case, a determination procedure different from that in the single-sided printing method is required. First, it is determined whether the print job is set for the manual double-sided printing method and an odd-number page has been printed (S404). If the determination result is Yes in step S404, a slip sheet is inserted as in single-sided printing (S407, S408). In the manual double-sided printing method, all odd-number pages are printed first to achieve double-sided printing. Then, the bundle of printed sheets having content printed on their odd-number pages are turned over and set in the printer to continue to print on the even-number pages. Double-sided printing is realized in this manner. When printing is to be performed using this function, slip sheets inserted for odd-number pages to be printed can also serve as slip sheets for even-number pages. For this reason, only when odd-number pages are to be printed, slip sheets are inserted as in single-sided printing. Manual double-sided printing can also be realized such that a sheet is turned over each time printing on one page is completed. In this case, processing can be performed as in automatic double-sided printing, which is to be discussed later.

If the determination result in step S404 is No, it is determined that the printing method is the automatic double-sided printing. If the printer 108 has therein a sheet turning mechanism for turning over sheets, double-sided printing is realized mainly by automatic double-sided printing, that is, by repeating for each page the process of printing on the front page of a sheet, turning over the sheet, and then printing on the rear page of the sheet. In this case, if the slip-sheet insert command is transmitted to the printer for each page, a slip sheet is inserted when the rear page of a sheet is to be printed after the front page of the sheet has been printed. In particular, when a blank page is inserted as a slip sheet, the rear page becomes a blank page, which leads to unsuccessful insertion of a slip sheet. Thus, in the case of automatic double-sided printing, a slip sheet is inserted not for each page but for each sheet, that is, after each even-number page has been printed. For this reason, it is determined in step S405 whether the printing method is the automatic double-sided printing method and the page of interest is an even-number page.

If the determination result is Yes in step S405, the flow proceeds to step S407, where a slip sheet is inserted. Since two pages of data need to be transmitted to eject one sheet of paper in the automatic double-sided printing mode, two blank pages need to be transmitted when a slip-sheet insert operation is to be achieved by sending blank pages instead of sending the slip-sheet insert command. If none of the conditions in steps S403, S404, and S405 is satisfied, it is determined whether there is a remaining page (S406). The page of interest is advanced (S410) to repeat printing pages until there is no remaining page. When there is no remaining page, a job end command is transmitted to the printer (S409), and printing ends.

Through the above-described procedure, a slip sheet is inserted for each printed sheet. By doing so, printed sheets can be prevented from being fouled by ink without having to provide an ink drying wait time for ink to dry.

[Exemplary Single-Sided Printing Processing in Automatic Insert Mode]

Next, the processing to be performed when the determination result in step S309 from FIG. 3 is Yes, that is, the process of analyzing data to be printed to automatically insert a slip sheet, will be described with reference to FIG. 5 to FIG. 10. First, single-sided printing processing in the automatic insert mode will be described with reference to FIG. 5.

Figure 5:
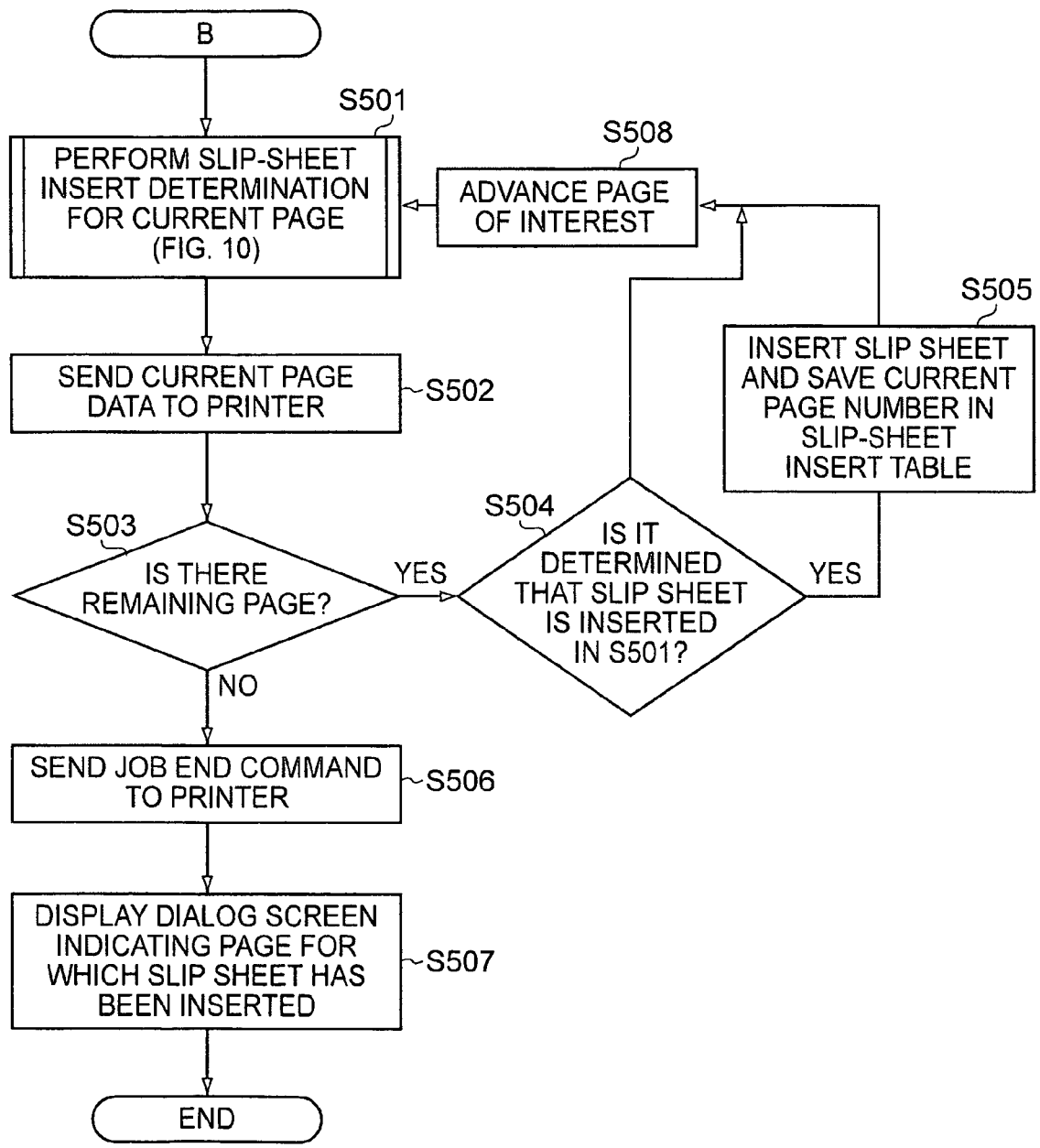
FIG. 5 is a diagram depicting a flowchart for exemplary processing subsequent to job initialization by the printer graphic driver when single-sided printing is carried out with a setting for automatically inserting slip sheets by analyzing the content to be printed.
Figure 10:
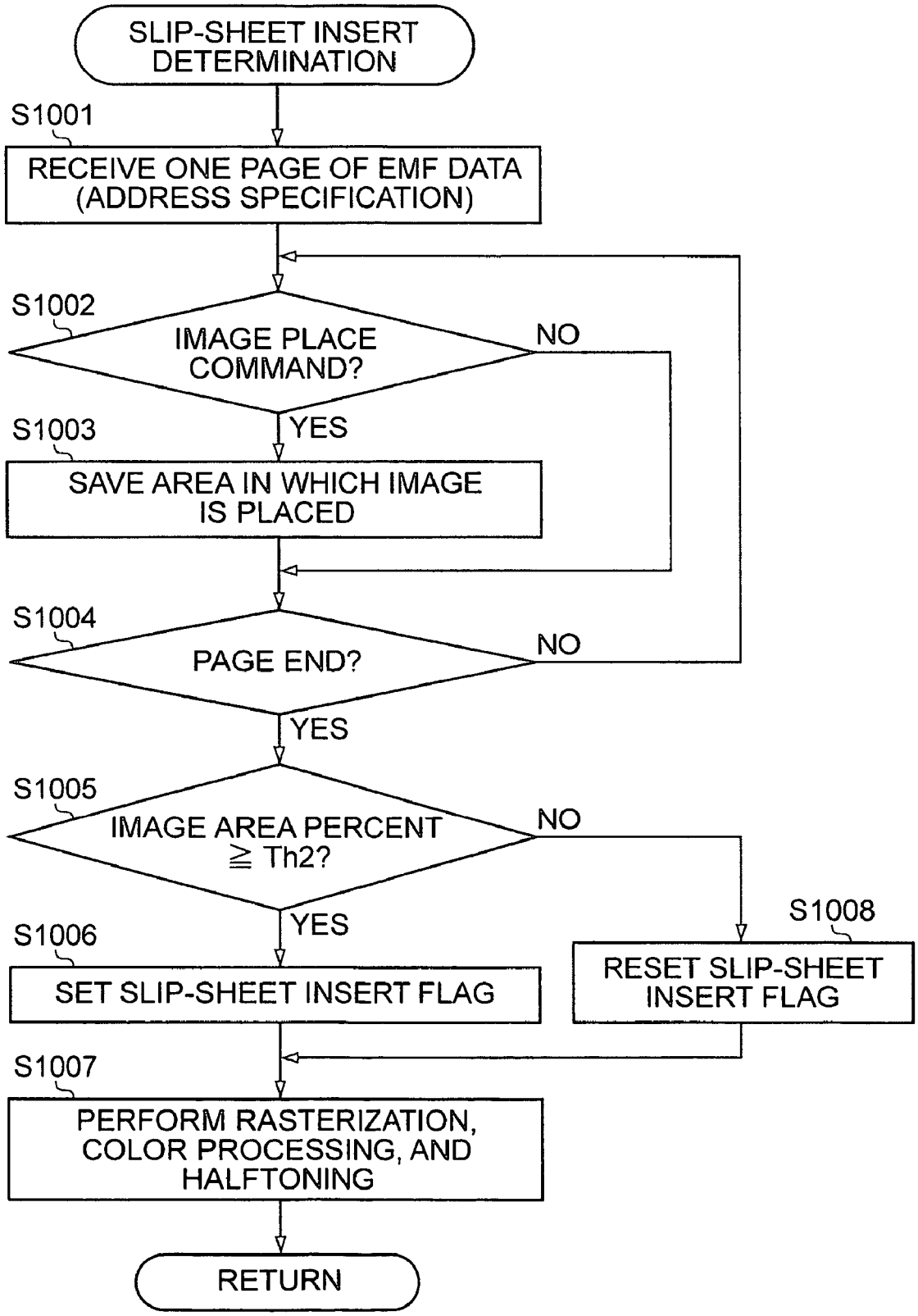
FIG. 10 is a diagram depicting a flowchart for an exemplary process of determining whether to insert a slip sheet with reference to EMF spool data.

FIG. 5 is a diagram depicting a flowchart for exemplary single-sided printing processing in the automatic slip-sheet insert mode to be carried out after initialization processing by the printer graphic driver 103, according to a third embodiment. First, it is determined whether to insert a slip sheet for the data of the page of interest received from the print processor 105 (S501). A detailed flowchart for the processing in step S501 is shown in FIG. 10. This determination result is temporarily saved in, for example, a DRAM. This saved data is referred to as a slip-sheet insert flag. Furthermore, rasterization and pseudo-halftone process (or quantization processing instead of pseudo-halftone process) of the page of interest are carried out during the slip-sheet insert determination processing. Next, the raster image data 106 and the halftone data 107 generated in step S501 are transmitted to the printer 108 (S502). Although these processes are described in different steps, it is also acceptable to sequentially transmit generated data to the printer and then determine whether or not to insert a slip sheet in a case where the processing proceeds sequentially such as from step S501 to step S502. This also applies to other flows including those to be described with reference to FIG. 6 and FIG. 8.

Next, it is determined whether or not there is a remaining page in the print job (S503). If there is a remaining page, the result of the slip-sheet insert determination in step S501 (i.e., the value of the slip-sheet insert flag) is referred to (S504). If the slip-sheet insert flag is on, that is, a slip sheet should be inserted, based on the result, a slip sheet is inserted and the number of the current page of interest is stored in a slip-sheet insert table provided in, for example, a DRAM (S505). Subsequently, the page of interest is advanced (S508) to repeat the processing from step S501 until there is no remaining print page. If there is no remaining page as a result of the determination made in step S503, a job end command is transmitted to the printer (S506), a dialog screen listing the numbers of the pages for which slip sheets have been inserted, which are stored in the slip-sheet insert table in step S505, is displayed (S507), and the processing ends.

As described with reference to FIG. 1, when there is a print request from the application 101, actual print data is first converted into the spool file 104 in EMF format by the GDI 102. In this embodiment, it is determined whether or not to insert a slip sheet based on this EMF spool data 104.

Figure 9A:
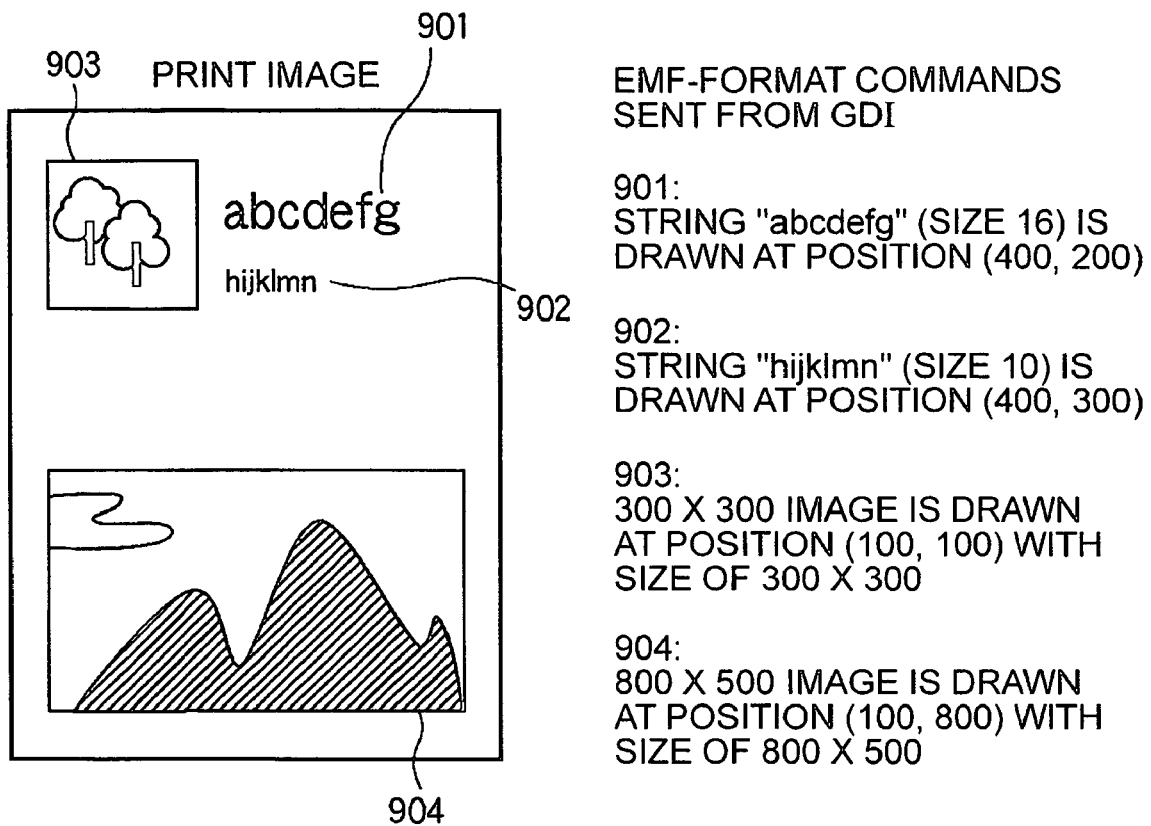
FIG. 9A is one example of EMF-format data transmitted from a print processor via a Graphics Device Interface (hereinafter, referred to as the GDI).

FIG. 9A is an example of the EMF spool data 104. For example, character strings 901 and 902 in the EMF data 104 are represented as commands in which character strings to be drawn, sizes, positions, etc. are specified. Similarly, images 903 and 904 are also represented as commands in which the original sizes, positions, drawing sizes, etc. are specified. The EMF data 104 includes various other commands including those for drawing straight lines and curves.

Figure 9B:
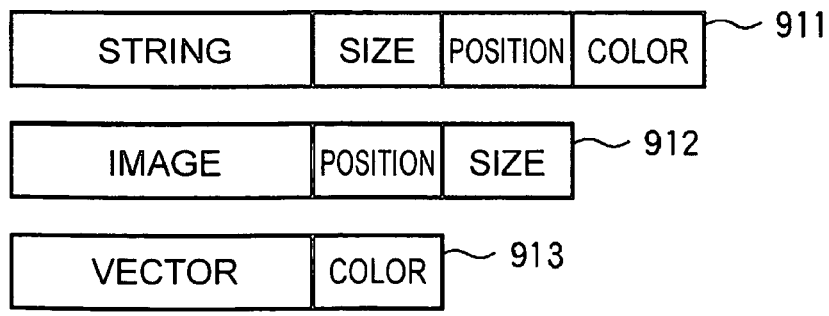
FIG. 9B is a general example of EMF-format data represented in combinations of various commands.

As shown in FIG. 9B, a character string is normally represented in the form of a command 911 including the code, size, position, and color of the character string; an image is normally represented in the form of a command 912 including the image data and the position and size thereof; and a vector graphic such as a graph is represented in the form of a command 913 including vector data and the color and other information thereof. It is noted that these are just examples.

[Exemplary Slip-Sheet Insert Determination Processing]

FIG. 10 is an example of a flowchart for determining whether or not to insert a slip sheet for a certain page by referring to the EMF data 104. This processing is carried out in step S501 of FIG. 5, in steps S602 and S608 of FIG. 6, and in step S802 of FIG. 8.

First, the printer graphic driver 103 receives one page of EMF spool data 104 from the print processor 105 (S1001). The EMF spool data 104 is data in which images, characters, and graphics are represented in the form of a collection of commands. For a determination as to whether to insert a slip sheet, commands that do not cause much ink to be consumed during printing, such as those for drawing character strings and lines, are all ignored. For this reason, it is determined whether or not the EMF spool data 104 corresponding to the page of interest contains an image place command indicating the drawing of images (S1002). One command is referred to at a time, and if an image place command is found, an area in which an image is placed is saved (S1003). An image place command is allowed to draw images one on another through processing for making the images transparent. For this reason, the area in which an image is placed is saved by providing a binary two-dimensional array (bit map) in the printer graphic driver 103 and assigning predetermined values to the bits corresponding to the image-placed area. In this manner, one page is analyzed for drawing commands to determine whether all commands included in the page of interest have been referred to (S1004). When analysis of the page of interest is completed, the proportion of the image area with respect to one page is compared with a threshold Th2 to determine whether to insert a slip sheet (S1005).

Here, the proportion of an image area is calculated by dividing the amount of data in the bit map corresponding to the image area included in the page by the amount of data corresponding to one page of bit map. The amount of data corresponding to one page of bit map can be determined from the sheet size and the resolution of the printer. Since the threshold in the current example is represented in percent, the proportion of the image area is also represented in percent. Furthermore, the threshold Th2 changes according to the level of slip-sheet insert determination specified with the scroll bar 205. A setting that greatly affects the amount of used ink includes the print quality setting. More specifically, the setting of image quality emphasized causes much more ink to be consumed than the setting of speed emphasized. To change the threshold Th2 depending on these two parameter settings, the printer graphic driver 103 retains a threshold table whose one example is shown in FIG. 13.

Figure 13:
FIG. 13 is a table containing exemplary slip-sheet insert thresholds determined according to combinations of print qualities and slip-sheet insert determination levels.

In FIG. 13, the horizontal direction indicates the automatic insert level 200f and the vertical direction indicates the print quality (the item in the top line indicates a combination of the print quality and the printing method). For example, if the printing method is set to the double-sided printing method and the print quality is set to fast, then one value is selected as the threshold Th2 from among the values in a field 1301 according to the automatic insert level 200f. For example, in a case where the printing method is set to the double-sided printing method and the print quality is set to fast, the threshold Th2 is 80% if the automatic insert level 200f is set to one of 1 to 3, and the threshold Th2 is 70% if the automatic insert level 200f is set to 4 or 5. Similarly, the threshold is selected from among the values in a field 1302 if the print quality is set to fast and the printing method is set to the single-sided printing method, the threshold is selected from among the values in a field 1303 if the print quality is set to standard, and the threshold is selected from among values in a field 1304 if the print quality is set to fine.

If the proportion of the image placed on the print sheet is over the threshold Th2 determined based on the current print setting by referring to the table of FIG. 13 as a result of the comparison in step S1005 (from FIG. 10), it is determined that a slip sheet should be inserted and the slip-sheet insert flag is set (S1006). For the subsequent transmission to the printer 108, rasterization, color processing, and halftoning are performed (S1007) to complete the processing for slip-sheet insert determination shown in FIGS. 5, 6, and 8. Rasterization and color processing can also be carried out concurrently during transmission to the printer. Furthermore, if the proportion of the image placed on the print sheet is equal to or below the threshold Th2 determined based on the current print setting by referring to the table of FIG. 13 as a result of the comparison in step S1005, it is determined that a slip sheet should not be inserted and the slip-sheet insert flag is reset (S1008).

The above-described processing is a simple approach where the processing speed is given priority. A more strict approach can also be employed for a command for placing character strings and other commands, such as summing the values obtained by multiplying the size of a character string by the number of characters, multiplying the result by a predetermined factor as required, and adding the result to the amount of data as part of the image area. Also for images, data (e.g., chroma and luminance level) for the image to be placed can be included as a determination criterion for more accurate determination as to whether to insert a slip sheet because, for example, a whitish image uses a smaller amount of ink. In the table shown in FIG. 13 for example, values in lower fields indicate that smaller amounts of ink are used. The average luminance level of one page of image is obtained based on image data, and if the obtained luminance level is equal to or higher than a certain value, one of the values in the field one level up the field determined according to the print quality (and the printing method) are employed as the threshold. Alternatively, if the obtained luminance level is equal to or higher than a certain value, a value (setting value for the automatic insert level 200f) one level up the original threshold can be employed as the threshold.

In this manner, it can be determined whether or not to insert a slip sheet based on the amount of ink used on the page of interest. If the amount of ink is equal to or larger than the threshold, the relevant page may undergo fouling due to undried ink, and therefore, a slip sheet is inserted for that page.

[Automatic Double-Sided Printing Processing in Automatic Insert Mode]

Figure 6:
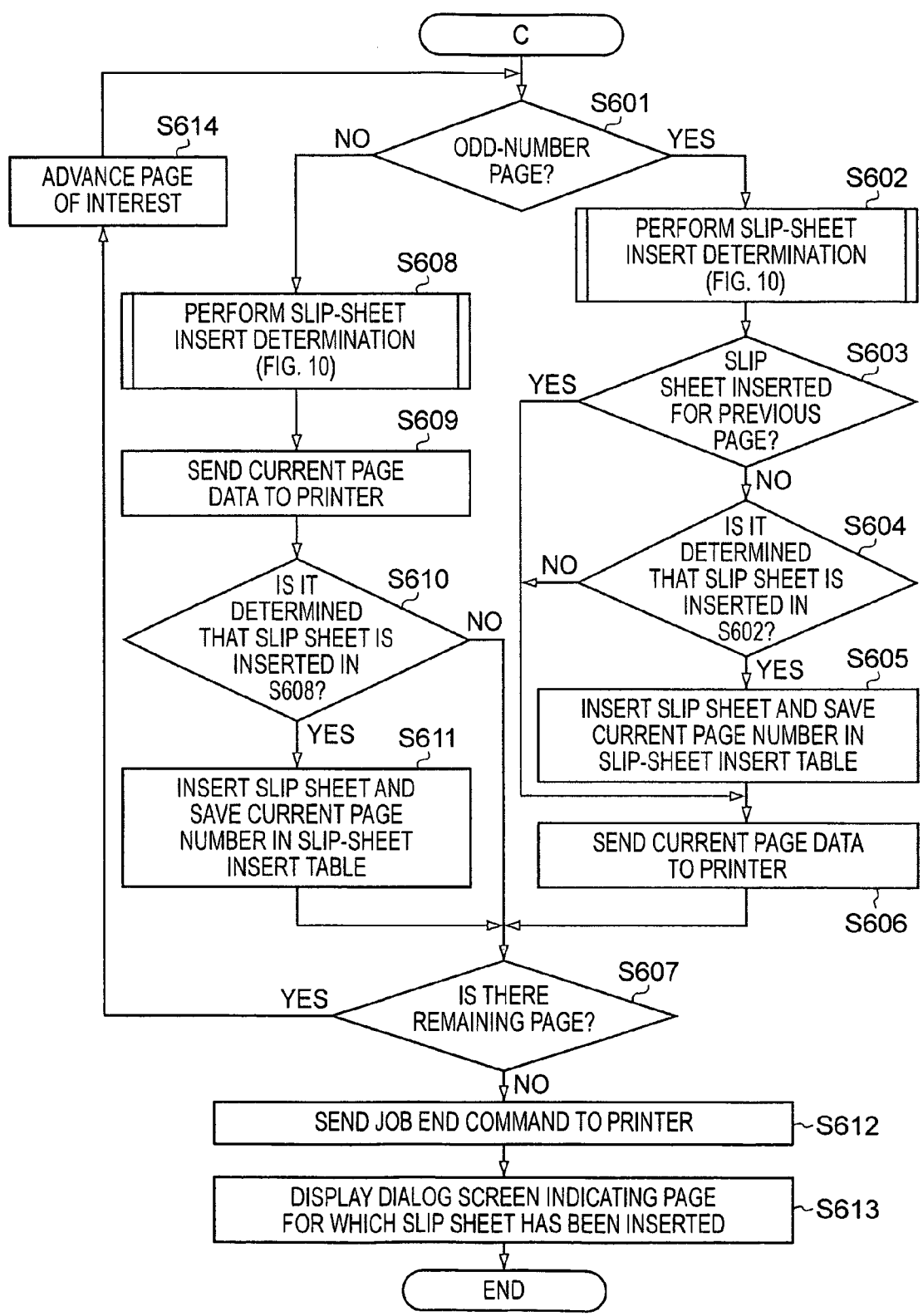
FIG. 6 is a diagram depicting a flowchart for exemplary processing subsequent to job initialization by the printer graphic driver when automatic double-sided printing is carried out with a setting for automatically inserting slip sheets by analyzing the content to be printed.

FIG. 6 is a diagram depicting a flowchart for exemplary automatic double-sided printing in the automatic insert mode. First, it is determined whether the current print page of interest is an odd-number page or an even-number page (S601). Processing to be carried out in a case where the current print page is an even-number page as a result of the determination in step S601 is described below. First, it is determined whether to insert a slip sheet (S608), and the current page data generated in step S608 is transmitted to the printer (S609). It is determined whether the slip-sheet insert flag is set in step S608 (S610), and a slip sheet is inserted if the slip-sheet insert flag is set (S611). As an output result of automatic double-sided printing (ejected bundle of sheets), even-number (2N, where N is an integer) pages and the subsequent odd-number (2N+1) pages face each other, such as page 2 facing page 3, page 4 facing page 5, and so on.

In short, inserting a slip sheet for each printed sheet results in state where an even-number page for which a slip sheet has been inserted and the subsequent odd-number page shares the same slip sheet. Therefore, a slip sheet inserted after printing of one sheet has been completed, that is, after the even-number page of the sheet has been printed also serves as a slip-sheet for the subsequent odd-number page. As described above, an even-number page and the subsequent odd-number page share one slip sheet. With this being the situation, if a slip-sheet insert command is issued for an even-number page, the page number is stored in the slip-sheet insert table in step S611. When an odd-number page is to be printed, this page number is referred to, so that if a slip-sheet insert command has been issued for the even-number page just before the current odd-number page, the issuance of a slip-sheet insert command for the current odd-number page is inhibited regardless of the result of determination as to whether to insert a slip sheet. The slip-sheet insert table is also used to display pages for which slip sheets have been inserted. Thereafter, it is determined whether there is a remaining page (S607). If there is a remaining page ("yes" in step S607), the next page of interest is advanced (S614) and the processing from step S601 is repeated if there is a remaining page. If there is no remaining page, a job end command is transmitted to the printer (S612), a dialog screen indicating the page numbers for which slip sheets have been inserted is displayed (S613) in the same manner as in FIG. 5, and then the printing ends.

If the result in step S601 indicates an odd-number page, the halftone data 107 is generated while a determination as to whether to insert a slip sheet is made (S602). For the above-described reason, if a slip-sheet insert command has been issued for the even-number page previous to the current odd-number page, it is not necessary to issue a slip-sheet insert command for the current odd-number page. Thus, it is determined whether a slip sheet has been inserted for the even-number page previous to the odd-number page of interest by referring to the numbers of the pages for which slip sheets have been inserted stored in step S611 (S603). If it is determined that a slip sheet has been inserted for the previous page, no slip sheet is inserted regardless of the value of the slip-sheet insert flag, and thus, the flow proceeds to step S606. If no slip sheet has been inserted for the previous page, it is determined whether the slip-sheet insert flag is set in step S602 (S604). If it is determined that the slip-sheet insert flag is set, a slip sheet is inserted (S605). In short, a slip-sheet insert command is issued. For a slip-sheet insert operation in automatic double-sided printing, two blank pages need to be transmitted when a slip-sheet insert operation is to be achieved by sending blank pages instead of sending a slip-sheet insert command, for the same reason as described above. Thereafter, the current page data is transmitted to the printer (S606). If it is determined in step S604 that no slip sheet should be inserted, the print data is transmitted to the printer 108 without inserting a slip sheet (S606).

Since odd-number pages in automatic double-sided printing are ejected normally face down as described above, a slip sheet for an odd-number page needs to be ejected before the odd-number page is printed. In this case, the final halftone data 107 generated in step S602 while a determination as to whether to insert a slip sheet is being made needs to be saved. Otherwise, the final halftone data 107 needs to be re-generated in step S606 before being transmitted to the printer 108, which is duplicated work. To avoid this waste work, data generated while a determination as to whether to insert a slip sheet is made is saved in a file or in a memory. In addition, except where it is determined whether to insert a slip sheet in step S602 by referring to the finally generated halftone data 107, data generated in step S602 may be converted into data in a format required to determine whether to insert a slip sheet before the flow proceeds to the subsequent step so that the rest of conversion is performed in step S606 while the data is being transmitted to the printer 108. By doing so, it is avoided to take the trouble of generating a file. If there is a remaining page, the processing from step S601 is repeated.

Through the above-described processing, one slip sheet is appropriately inserted if it is determined that a slip sheet is required for at least one of adjoining odd-number and even-number pages in a case where the printing method is set to the automatic double-sided printing method in the automatic slit-sheet insert mode. As a result, a slip sheet is appropriately inserted, which not only allows the consumption of sheets to be saved but also prevents a page from being fouled due to contact with an ink-undried page.

[Manual Double-Sided Printing Processing in Automatic Insert Mode]

Next, processing in manual double-sided printing will be described in detail with reference to FIG. 7 and FIG. 8. In manual double-sided printing, odd-number pages are printed on the front faces of sheets first, followed by even-number pages being printed on the rear faces. Assuming that data composed of seven pages is printed, pages 1, 3, 5, and 7 are first printed, followed by a user turning over all the printed sheets to continue to printing of pages 2, 4, and 6. FIG. 7 shows one example of changes in slip-sheet locations for manual double-sided printing. In this example, a print job including seven pages of data is executed, where slip sheets 701b and 701a are inserted for pages 1 and 5, respectively. If printing on the front faces of sheets proceeds in the order of page 1, a slip sheet, and page 3, printing on the rear faces of the sheets proceeds in the order of page 2, the slip sheet, and page 4. This means that the slip sheet for page 1 in printing on the front faces serves for page 2 in printing on the rear pages. In other words, the slip sheet 701b serving for page 1 when printing on the odd-number pages is ended moves between pages 2 and 3 as a slip sheet 702b when printing on the even-number pages is completed. Similarly, the slip sheet 701a serving for page 5 when printing on the odd-number pages is ended moves between pages 6 and 7 as a slip sheet 702a when printing on the even-number pages is completed. In this manner, a slip sheet inserted after odd-number page N is printed serves as a slip sheet between pages (N+1) and (N+2) after the even-number pages have been printed.

For this reason, if slip sheets are inserted for normally printed odd-number pages, two additional processes are required when even-number pages are to be printed. First, when even-number page N is to be printed, a slip sheet needs to be inserted before page N is printed if a slip sheet has been inserted for page (N−1). This is because the slip sheet moves and cannot serve for a print page requiring a slip sheet. Thus, a slip sheet needs to be re-inserted. Second, when even-number page N of interest is to be printed, even though a slip sheet has been inserted for odd-number page (N−1), it is not necessary to insert a slip sheet before page N is printed if a slip sheet has been inserted immediately after even-number page (N−2) was printed. Third, when even-number page N is to be printed, it is not necessary to insert a new slip sheet for page N, that is, it is sufficient to simply perform paper-feeding and paper ejection, if a slip sheet has been inserted for odd-number page (N−1). This is because the slip sheet that has been inserted for odd-number page (N−1) just before page N moves to serve as a slip sheet for even-number page N.

FIG. 8 is a diagram depicting a flowchart for exemplary manual double-sided printing to be carried out after the initialization processing by the printer graphic driver 103. First, it is determined whether the page of interest to be printed is an odd-number page (S801). If the page of interest is an odd-number page, the following normal processing is carried out: it is determined whether or not to insert a slip sheet (S802), the generated data is transmitted to the printer 108 (S803), it is determined whether the slip-sheet insert flag is set in step S802 (S804), and a slip sheet is inserted and the current page number is stored if the slip-sheet insert flag is set (S805). If the slip-sheet insert flag is not set or after a slip sheet has been inserted, it is determined whether there is a remaining page (S806), and if there is a remaining page, the page of interest is advanced to the subsequent page to repeat the processing from step S801 (S816). In the case of manual double-sided printing, the term "subsequent page" means the page obtained adding two to the current page number, except where the sheets are turned over to switch from printing of odd-number pages to printing of even-number pages. When printing of the odd-number pages is completed and printing of the even-number pages is started, the page counter is initialized to two.

If the print page of interest is an even number as a result of the determination in step S801, it is checked whether a slip sheet was inserted when page (N−1) (assuming that the number of the page currently being printed is N) was printed by referring to the data saved in step S805 (S807). If no slip sheet was inserted for page (N−1), no special processing is required, that is, it is sufficient to perform the processing from step S802 as in printing of odd-number pages. On the other hand, if a slip-sheet was inserted for page (N−1) as a result of the determination in step S807, it is checked whether a slip sheet was inserted when page (N−2) was printed by referring to the data saved in step S813 (S808). If the determination result is No in step S808, the slip sheet for the odd-number page on the opposite face of the page of interest has moved away after printing of the page of interest is ended. For this reason, a new slip sheet for the odd-number page needs to be inserted (S809). In this case, since the number of the page for which the slip sheet has been inserted is already stored, the page number does not need to be stored again. If the determination result is Yes in step S808, a slip sheet for the even-number page currently being printed already exists, and therefore, the flow proceeds to step S810 without inserting a slip sheet.

When the insertion of the slip sheet is completed, data to be transmitted to the printer 108 is generated (S810) and is then transmitted to the printer 108 (S811) for printing. After printing, since a slip sheet inserted while the odd-number page was printed remains in the paper-feed port, it is fed and ejected (S812). Since the sheet fed and ejected in step S812 serves as a slip sheet for the page of interest, the number of the page of interest is stored in the slip-sheet insert table in step S813. Although in steps S809 and S805 a new slip sheet may be provided from a paper-feed port different from the one for print sheets, it should be noted that in step S812 a slip sheet is provided from the same paper-feed port as that for print sheets. If there is no remaining page as a result of the determination in step S806, a job end command is transmitted to the printer (S814), a dialog screen indicating the numbers of the pages for which slip sheets have been inserted are displayed (S815) as described above, and printing ends.

Through the above-described procedure, a condition for slip-sheet insert operation is satisfied also in manual double-sided printing, where a slip sheet can be inserted so as to follow a face of the preceding sheet that has just been printed. In this manner, print sheets can be prevented from being fouled due to undried ink. In addition, since a slip-sheet insert level can be specified by the operator, the slip-sheet insert determination criterion can be changed manually.

Second Exemplary Embodiment

Figure 11:
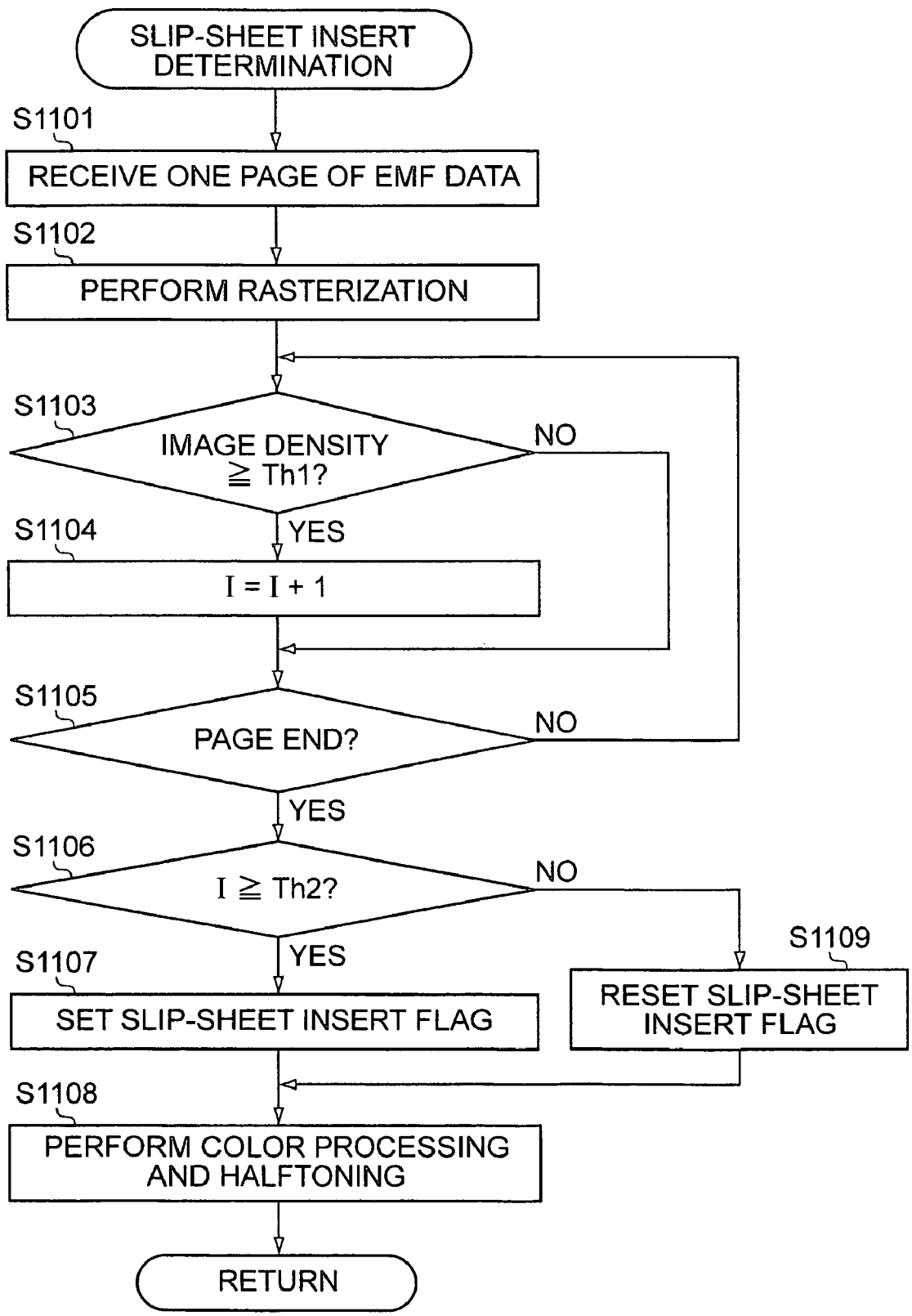
FIG. 11 is a diagram depicting a flowchart for an exemplary process of determining whether to insert a slip sheet with reference to raster image data, according to a second embodiment.

Processing in a case where the slip-sheet insert determination in steps S501, S602, S608, and S802 is made based on the raster image data 106 will now be described with reference to FIG. 11. FIG. 11 is a flowchart for exemplary slip-sheet insert determination processing, according to a second embodiment, carried out in place of the processing in FIG. 10 according to the first embodiment.

For the raster image data 106, both character strings and images are represented as a collection of the values of pixels obtained by dividing the characters and images into a matrix. For this reason, all content to be printed can be analyzed consistently through the same processing, whether they are character strings or images. In order to determine whether to insert a slip sheet for a certain page by referring to the raster image data 106, the processing shown in FIG. 11 is carried out, for example. First, one page of EMF spool data 104 received from the print processor 105 is received (S1101). The density of each rasterized pixel is examined while it is rasterized (S1102). If the density value of the pixel of interest is equal to or higher than a predetermined threshold Th1 (S1103), count I is incremented (S1104). It is determined whether the above-described processing has been applied to all items of data for the one page (S1105). If there is data that has not been subjected to the above-described processing, the pixel of interest is advanced in order of, for example, rasterization to repeat the processing from step S1103. A value I counted as described above is compared with the threshold Th2 (S1106). If the value I is larger than the threshold Th2, the slip-sheet insert flag is set on (S1107). If the value I is equal to or smaller than the threshold Th2, the slip-sheet insert flag is set off (S1109). In this example, the threshold Th2 is determined based on the quality and the slip-sheet insert determination level as shown in FIG. 13. Since the raster image data 106 is already generated at the time when it is determined whether to insert a slip sheet as described above, color processing and halftoning are carried out subsequently (S1108), and then the process of determining whether to insert a slip sheet ends. In addition, color processing and halftoning after rasterization can also be carried out at the time of transmission to the printer as in the first embodiment. Although it is determined whether to insert a slip sheet by counting only the pixels having a density value larger than Th1 in this embodiment, an approach for counting all density values is also acceptable.

Whether or not to insert a slip sheet can be determined by the above-described slip-sheet insert determination processing based on the proportion of the number of pixels having a pixel density value equal to or larger than a predetermined value with respect to the number of pixels on the entire page. The larger a pixel density value, the larger amount of ink is used for the pixel. Therefore, as the number of pixels with high density values increases, the amount of ink used for the page also increases. Accordingly, a longer time is required for ink to dry on such a page. In this embodiment, pages that will take a longer time for ink to dry are determined based on the density of each pixel and the proportion of such pixels. Thus, whether or not a slip sheet needs to be inserted for a certain page can be determined according to an estimated ink drying wait time on that page, and therefore, pages requiring slip sheets can be appropriately determined.

Third Exemplary Embodiment

Figure 12:
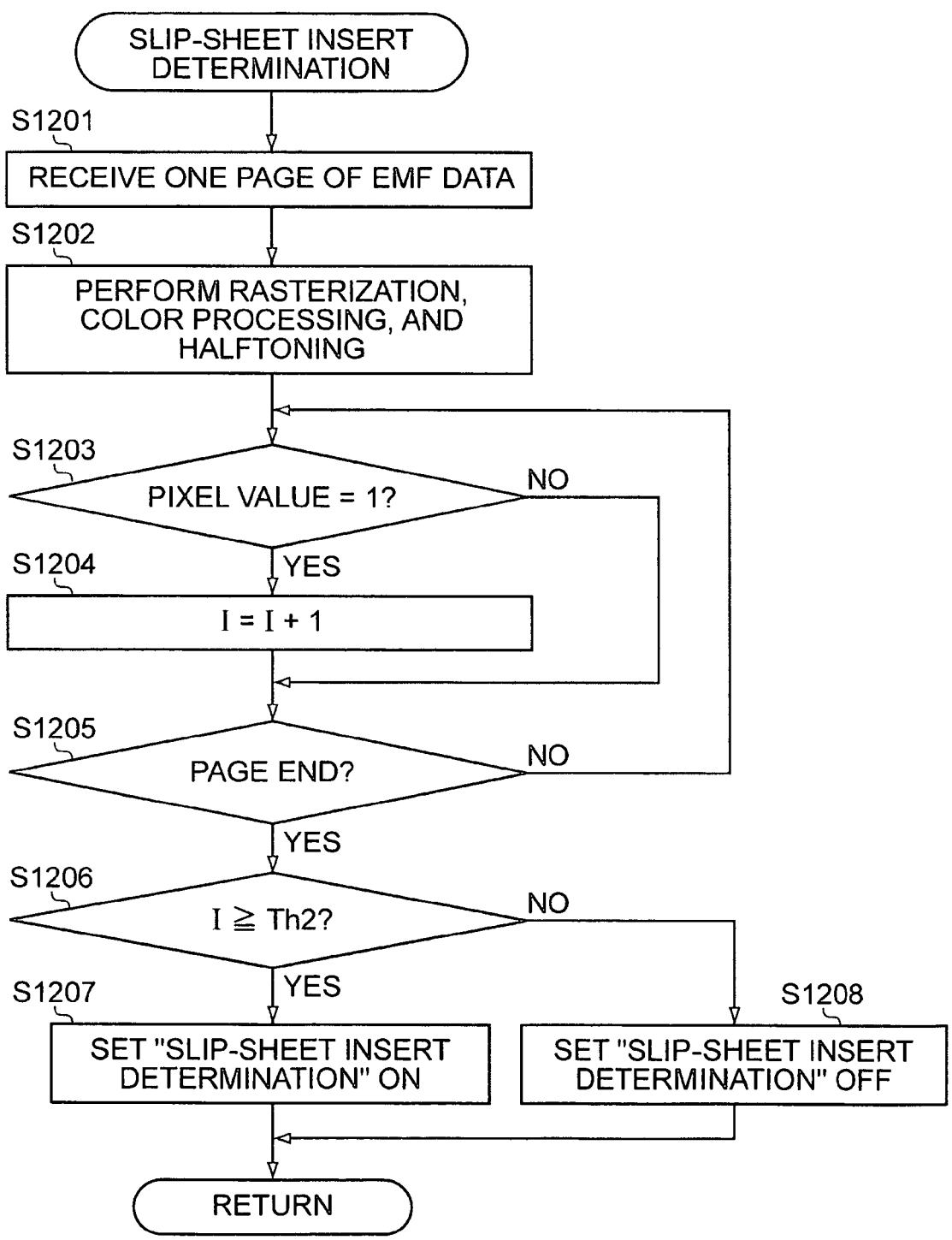
FIG. 12 is a diagram depicting a flowchart for an exemplary process of determining whether to insert a slip sheet with reference to halftone data, according to a third embodiment.

Exemplary processing in a case where the slip-sheet insert determination in steps S501, S602, S608, and S802 is made based on the halftone data 107 will now be described with reference to FIG. 12. FIG. 12 is a flowchart for exemplary slip-sheet insert determination processing, according to a third embodiment, carried out in place of the processing in FIG. 10 according to the first embodiment.

Here, the halftone data 107 is an image which is basically represented in two values for each color component, and is obtained by converting the raster image data 106 represented in the RGB color space into an image in the CMYK color space. The value of each of C, M, Y, and K is represented in two values as described above, based on which the actual amount of ink to be discharged by the printer 108 can be calculated. Although there are other types of printer 108 for representing the halftone data 107 not in two values but in multiple values to perform printing in a predetermined pattern corresponding to each of the multiple values, such types of printer 108 also employ the process of retaining a table in the printer graphic driver 103 and referring to the table to uniquely calculate the ejection amount of ink.

FIG. 12 is a flowchart for determining whether or not to insert a slip sheet using the halftone data 107. First, one page of EMF data 104 is received from the print processor 105 (S1201). Next, rasterization, color processing, and halftoning are carried out (S1202). The value of each color component at the pixel of interest is checked with reference to the generated halftone data 107 or with reference to the halftone data 107 being generated (S1203). If the pixel value of each of C, M, Y, and K is one, that is, ink is discharged for the pixel, the count I is incremented (S1204). If each color component is represented not in two values but in multiple values as described above, the ejection amount of ink corresponding to the value is checked by referring to the table and the value is added to I. It is determined whether the process for one page is completed (S1205). If the process for one page is not yet completed, the pixel of interest is advanced in the order of rasterization and the processing from step S1203 is repeated. The above-described processing is repeated until the process for one page is completed. It is determined whether the value I counted in this manner is larger then the threshold Th2 (S1206). If the value I is larger than the threshold Th2, the slip-sheet insert flag is set on (S1207). If the value I is not larger than the threshold Th2, the slip-sheet insert flag is set off (S1208). The threshold Th2 is determined based on the print quality and the slip-sheet insert determination level as shown by the example in FIG. 13. Now, determination as to whether to insert a slip sheet for one page based on the halftone data 107 is completed.

Whether or not to insert a slip sheet can be determined by the above-described slip-sheet insert determination processing based on the proportion of the number of pixels having an ink ejection amount equal to or larger than a predetermined value with respect to the number of pixels on the entire page. For this reason, pages with a large amount of ink requiring a longer time for the ink to dry can be reliably identified. In this embodiment, pages that will take a longer time for ink to dry are determined based on the value of each pixel after halftoning and the proportion of such pixels. Thus, whether or not a slip sheet needs to be inserted for a certain page is determined according to an estimated ink drying wait time on that page, and therefore, pages requiring slip sheets can be appropriately determined.

Fourth Exemplary Embodiment

Exemplary processing in a case where the slip-sheet insert determination in steps S501, S602, S608, and S802 is made based on the halftone data 107 will now be described with reference to FIGS. 15 and 16. FIG. 15 is a flowchart for slip-sheet insert determination processing, according to a fourth embodiment, carried out in place of the processing in FIG. 10 according to the first embodiment. In this embodiment, a time required to insert a slip sheet is set as a predetermined value, which is compared with the ink drying wait time determined from the paper type and the print quality to select processing requiring a shorter process time.

Referring to FIG. 15, the current print setting information is accessed to read out the value of each of items "print quality" and "paper type" (S1501). Then, a media/quality drying-time table 1601 shown in FIG. 16 is searched using these values (S1502). The media/quality drying-time table 1601 is a table containing index values of ink drying wait time based on the values of the print quality and the paper type. In the example of FIG. 16, if the print quality is "fine" and the paper type "professional photographic paper", then the index value of the ink drying wait time is obtained as 15. The settings in the media/quality drying-time table 1601 can be modified by the operator as part of the print setting information.

In step S1503, an index value obtained by accessing the media/quality drying-time table 1601 is compared with the index value (threshold value) for the predetermined slip-sheet insert time. If the ink drying wait time is smaller than the threshold value as a result of the comparison, then the slip-sheet insert flag is reset (S1505). If the ink drying wait time is larger than the threshold, then the slip-sheet insert flag is set (S1504). If the ink drying wait time is equal to the threshold, the slip-sheet insert flag is reset to save the consumption of slip sheets. It is noted that the index value (threshold value) for the slip-sheet insert time can be a programmable value. Finally, rasterization and halftoning of the page of interest are performed (S1506).

Whether or not a slip sheet should be inserted can be determined through the above-described simple processing.

In this embodiment, if the printer 108 has an ink drying wait time mode, the ink drying wait time mode can be turned on when no slip sheet is inserted. If the printer 108 does not have an ink drying wait time mode, for example, the period of time from when printing of the page of interest is completed (without providing an ink drying wait time) to when the sheet of the subsequent page is ejected can be used instead of the index value (threshold value) for slip-sheet insert time. By doing so, the printer driver is made to automatically determine whether or not to insert a slip sheet for printers without an ink drying wait time mode.

Other Exemplary Embodiments

The present invention can also be achieved by supplying a system or an apparatus with a recording medium recording program code of software for achieving the functions according to the above-described embodiments and then causing a computer (or CPU or MPU) of the system or the apparatus to load the program code from the storage medium and execute it. In this case, the program code itself read from the recording medium achieves the functions of the above-described embodiments. Thus, the recording medium recording the program code is included in the present invention. The recording medium for supplying the program code includes a flexible disk, a hard disk, an optical disk, a magneto-optical disk, a CD-ROM, a CD-R, a magnetic tape, a non-volatile memory card, and a ROM.

As described above, the functions of the above-described embodiments are achieved with the execution of the program code read by the computer. In addition, the functions of the above-described embodiments may also be achieved by the operating system (OS) running on the computer that performs all or part of the processing according to the commands of the program code.

Furthermore, the functions of the above-described embodiments may also be achieved such that the program code read from the recording medium is written to a memory provided in an expansion card disposed in the computer or an expansion unit connected to the computer, and then, for example, the CPU provided on the expansion card or the expansion unit performs all or part of the processing based on commands in the program code.

Furthermore, the present invention covers a printer 108 having only one paper-feed port. In this case, although step S809 cannot be performed for inserting a new slip sheet while even-number pages are printed in the manual double-sided printing mode, the same advantage can be offered by inserting necessary slip sheets when odd-number page are printed.

In addition, when it is determined whether to insert a slip sheet depending on an image to be printed, the threshold as a criterion for determining whether to insert a slip sheet can be changed based on parameters including the type of specified paper (e.g., whether the paper in question has high ink absorption), the type of ink, the number of copies (ink transfer to other sheets is more likely to occur due to weight of sheets if many sheets are stacked one on another).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-137891 filed May 10, 2005, which is hereby incorporated by reference herein in its entirety.

What is claimed is:

1. An information processing apparatus comprising:
a determination unit configured to determine whether or not a ratio of an image region in a page is equal to or larger than a threshold value;
a control unit configured to control a printer to print the image on a sheet without inserting a slip sheet when the determination unit determines the ratio of the image in the page to be smaller than the threshold value and to print the image on the sheet with inserting the slip sheet when the determination unit determines the ratio of the image in the page to be equal to or larger than the threshold value; and
a second determination unit configured to determine whether the slip sheet is inserted for a previous page during double-sided printing,
wherein the control unit controls the printer to print the image on the sheet without inserting the slip sheet when the second determination unit determines that the slip page is inserted for the previous page, controls the printer to print the image on the sheet without inserting the slip sheet when the second determination unit determines that the slip sheet is not inserted for the previous page and the determination unit determines that the ratio of the image in the page is not equal to or larger than the threshold value, and controls the printer to print the image on the sheet with inserting the slip sheet when the second determination unit determines that the slip page is not inserted for the previous page and the determination unit determines that the ratio of the image in the page is equal to or larger than the threshold value.

2. The information processing apparatus according to claim 1,
wherein the determination by the determination unit is executed before a rasterizing processing.

3. The information processing apparatus according to claim 1,
wherein the determination by the determination unit is executed based on a threshold table storing threshold values different from each other in accordance with print quality.

4. An information processing apparatus comprising:
a determination unit configured to determine whether or not a number of pixels having a pixel density value equal to or larger than a fist threshold value is equal to or larger than a second threshold value;
a control unit configured to control a printer to print an image on a sheet without inserting a slip sheet when the determination unit determines the number of the pixels having the pixel density value equal to or larger than the first threshold value to be smaller than the second threshold value and to print the image on the sheet with inserting the slip sheet when the determination unit determines the number of the pixels having the pixel density value equal to or larger than the first threshold value to be equal to or larger than the second threshold value; and
a second determination unit configured to determine whether the slip sheet is inserted for a previous page during double-sided printing,
wherein the control unit controls the printer to print the image on the sheet without inserting the slip sheet when the second determination unit determines that the slip page is inserted for the previous page, controls the printer to print the image on the sheet without inserting the slip sheet when the second determination unit determines that the slip sheet is not inserted for the previous page and the determination unit determines that the ratio of the image in the page is not equal to or larger than the threshold value, and controls the printer to print the image on the sheet with inserting the slip sheet when the second determination unit determines that the slip page is not inserted for the previous page and the determination unit determines that the ratio of the image in the page is equal to or larger than the threshold value.

5. The information processing apparatus according to claim 4,
wherein the determination by the determination unit is executed after a rasterizing processing.

6. The information processing apparatus according to claim 4,
wherein the determination by the determination unit is executed based on a threshold table storing the second threshold value different from each other in accordance with print quality.

7. An information processing apparatus comprising:
a determination unit configured to determine whether or not a number of pixels for which ink is discharged is equal to or larger than a threshold value;
a control unit configure to control a printer to print an image on a sheet without inserting a slip sheet when the determination unit determines the number of pixels for which ink is discharged to be smaller than the threshold value and to print the image on the sheet with inserting a slip sheet when the determination unit determines the number of pixels for which ink is discharged to be equal to or larger than the threshold value; and
a second determination unit configured to determine whether the slip sheet is inserted for a previous page during double-sided printing,
wherein the control unit controls the printer to print the image on the sheet without inserting the slip sheet when the second determination unit determines that the slip page is inserted for the previous page, controls the printer to print the image on the sheet without inserting the slip sheet when the second determination unit determines that the slip sheet is not inserted for the previous page and the determination unit determines that the ratio of the image in the page is not equal to or larger than the threshold value, and controls the printer to print the image on the sheet with inserting the slip sheet when the second determination unit determines that the slip page is not inserted for the previous page and the determination unit determines that the ratio of the image in the page is equal to or larger than the threshold value.

8. The information processing apparatus according to claim 7,
wherein the determination by the determination unit is executed after a halftone processing.

9. The information processing apparatus according to claim 7,
wherein the determination by the determination unit is executed based on a threshold table storing threshold values different from each other in accordance with print quality.

10. A method for controlling an information processing apparatus which includes a determination unit, a second determination unit, and control unit, the method comprising:
via the determination unit, determining whether or not a ratio of an image region in a page is equal to or larger than a threshold value;
via the control unit, controlling a printer to print the image on a sheet without inserting a slip sheet when the determination unit determines the ratio of the image in the page to be smaller than the threshold value and to print the image on the sheet with inserting the slip sheet when the determination unit determines the ration of the image in the image to be equal to or larger than the threshold value; and via the second determination unit, determining whether the slip sheet is inserted for a previous page during double-sided printing, wherein the control unit controls the printer to print the image on the sheet without inserting the slip sheet when the second determination unit determines that the slip page is inserted for the previous page, controls the printer to print the image on the sheet without inserting the slip sheet when the second determination unit determines that the slip sheet is not inserted for the previous page and the determination unit determines that the ratio of the image in the page is not equal to or larger than the threshold value, and controls the printer to print the image on the sheet with inserting the slip sheet when the second determination unit determines that the slip page is not inserted for the previous page and the determination unit determines that the ratio of the image in the page is equal to or larger than the threshold value.

11. The method according to claim 10, wherein the determining by the determination unit is executed before a rasterizing processing.

12. The method according to claim 10, wherein the determining by the determination unit is executed based on a threshold table storing threshold values different from each other in accordance with print quality.

13. A method for controlling an information processing apparatus including a determination unit, a second determination unit, and control unit, the method comprising:

via the determination unit, determining whether or not a number of pixels having a pixel density value equal to or larger than a fist threshold value is equal to or larger than a second threshold value;

via the control unit, controlling a printer to print an image on a sheet without inserting a slip sheet when the determination unit determines the number of the pixels having the pixel density value equal to or larger than the first threshold value to be smaller than the second threshold value and to print the image on the sheet with inserting the slip sheet when the determination unit determines the number of the pixels having the pixel density value equal to or larger than the first threshold value to be equal to or larger than the second threshold value; and via the second determination unit, determining whether the slip sheet is inserted for a previous page during double-sided printing, wherein the control unit controls the printer to print the image on the sheet without inserting the slip sheet when the second determination unit determines that the slip page is inserted for the previous page, controls the printer to print the image on the sheet without inserting the slip sheet when the second determination unit determines that the slip sheet is not inserted for the previous page and the determination unit determines that the ratio of the image in the page is not equal to or larger than the threshold value, and controls the printer to print the image on the sheet with inserting the slip sheet when the second determination unit determines that the slip page is not inserted for the previous page and the determination unit determines that the ratio of the image in the page is equal to or larger than the threshold value.

14. The method according to claim 13, wherein the determining by the determination unit is executed after a rasterizing processing.

15. The method according to claim 13, wherein the determining by the determination unit is executed based on a threshold table storing the second threshold value different from each other in accordance with print quality.

16. A method for controlling an information processing apparatus comprising including a determination unit, a second determination unit, and control unit, the method comprising:

via a determination unit, determining whether or not a number of pixels for which ink is discharged is equal to or larger than a threshold value;

via a control unit, controlling a printer to print an image on a sheet without inserting a slip sheet when the determination unit determines the number of pixels for which ink is discharged to be smaller than the threshold value and to print the image on the sheet with inserting a slip sheet when the determination unit determines the number of pixels for which ink is discharged to be equal to or larger than the threshold value; and via the second determination unit, determining whether the slip sheet is inserted for a previous page during double-sided printing, wherein the control unit controls the printer to print the image on the sheet without inserting the slip sheet when the second determination unit determines that the slip page is inserted for the previous page, controls the printer to print the image on the sheet without inserting the slip sheet when the second determination unit determines that the slip sheet is not inserted for the previous page and the determination unit determines that the ratio of the image in the page is not equal to or larger than the threshold value, and controls the printer to print the image on the sheet with inserting the slip sheet when the second determination unit determines that the slip page is not inserted for the previous page and the determination unit determines that the ratio of the image in the page is equal to or larger than the threshold value.

17. The method according to claim 16, wherein the determination by the determination unit is executed after a halftone processing.

18. The method according to claim 16, wherein the determination by the determination unit is executed based on a threshold table storing threshold values different from each other in accordance with print quality.

* * * * *